United States Patent
Ahmadi et al.

(10) Patent No.: US 11,955,122 B1
(45) Date of Patent: Apr. 9, 2024

(54) DETECTING MACHINE-OUTPUTTED AUDIO

(71) Applicant: Amazon Technologies, Inc., Seattle, WA (US)

(72) Inventors: Mansour Ahmadi, Bothell, WA (US); Udhgee Murugesan, Bellevue, WA (US); Roger Hau-Bin Cheng, Santa Clara, CA (US); Roberto Barra Chicote, Cambridge (GB); Kian Jamali Abianeh, Saratoga, CA (US); Yixiong Meng, San Jose, CA (US); Oguz Hasan Elibol, Sunnyvale, CA (US); Itay Teller, Sunnyvale, CA (US); Kevin Kwanghoon Ha, Bellevue, WA (US); Andrew Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 17/487,434

(22) Filed: Sep. 28, 2021

(51) Int. Cl.
| | |
|---|---|
| *G10L 15/22* | (2006.01) |
| *G06N 3/044* | (2023.01) |
| *G10L 15/02* | (2006.01) |
| *G10L 15/16* | (2006.01) |
| *G10L 15/18* | (2013.01) |
| *G10L 25/21* | (2013.01) |
| *G10L 25/30* | (2013.01) |
| *G10L 25/69* | (2013.01) |
| *G10L 15/08* | (2006.01) |

(52) U.S. Cl.
CPC ............. *G10L 15/22* (2013.01); *G06N 3/044* (2023.01); *G10L 15/02* (2013.01); *G10L 15/16* (2013.01); *G10L 15/18* (2013.01); *G10L 25/21* (2013.01); *G10L 25/30* (2013.01); *G10L 25/69* (2013.01); *G10L 2015/088* (2013.01)

(58) Field of Classification Search
CPC ......... G10L 25/69; G10L 15/02; G10L 15/16; G10L 15/18; G10L 15/22; G10L 25/21; G10L 25/30; G10L 2015/088
See application file for complete search history.

(56) References Cited

U.S. PATENT DOCUMENTS

| | | | | |
|---|---|---|---|---|
| 9,865,253 | B1 * | 1/2018 | De Leon | G10L 25/90 |
| 10,446,147 | B1 * | 10/2019 | Moniz | G06F 40/205 |
| 11,328,721 | B2 * | 5/2022 | Yang | G10L 15/22 |
| 11,361,763 | B1 * | 6/2022 | Maas | G10L 15/18 |
| 2009/0259468 | A1 * | 10/2009 | Schroeter | G10L 17/20 |
| | | | | 704/E17.001 |

(Continued)

*Primary Examiner* — Douglas Godbold
(74) *Attorney, Agent, or Firm* — Pierce Atwood LLP

(57) ABSTRACT

Techniques for determining whether audio is machine-outputted or non-machine-outputted are described. A device may receive audio, may process the audio to determine audio data including audio features corresponding to the audio, and may process the audio data to determine audio embedding data. The device may process the audio embedding data to determine whether the audio is machine-outputted or non-machine-outputted. In response to determining that the audio is machine-outputted, then the audio may be discarded or not processed further. Alternatively, in response to determining that the audio is non-machine-outputted (e.g., live speech from a user), then the audio may be processed further (e.g., using ASR processing).

21 Claims, 12 Drawing Sheets

(56) References Cited

U.S. PATENT DOCUMENTS

| | | | |
|---|---|---|---|
| 2019/0051299 A1* | 2/2019 | Ossowski | G10L 15/22 |
| 2020/0082830 A1* | 3/2020 | Lesso | G10L 25/78 |
| 2021/0142792 A1* | 5/2021 | Wantland | G06F 16/685 |
| 2021/0193174 A1* | 6/2021 | Enzinger | G10L 17/00 |
| 2021/0233541 A1* | 7/2021 | Chen | G10L 17/08 |
| 2022/0070207 A1* | 3/2022 | Simonchik | G10L 15/16 |
| 2022/0093106 A1* | 3/2022 | Mosayyebpour Kaskari | G06N 3/044 |
| 2022/0157316 A1* | 5/2022 | Rebryk | G10L 15/16 |
| 2022/0172739 A1* | 6/2022 | Shor | G10L 25/69 |
| 2022/0335950 A1* | 10/2022 | Wang | G06N 3/08 |

* cited by examiner

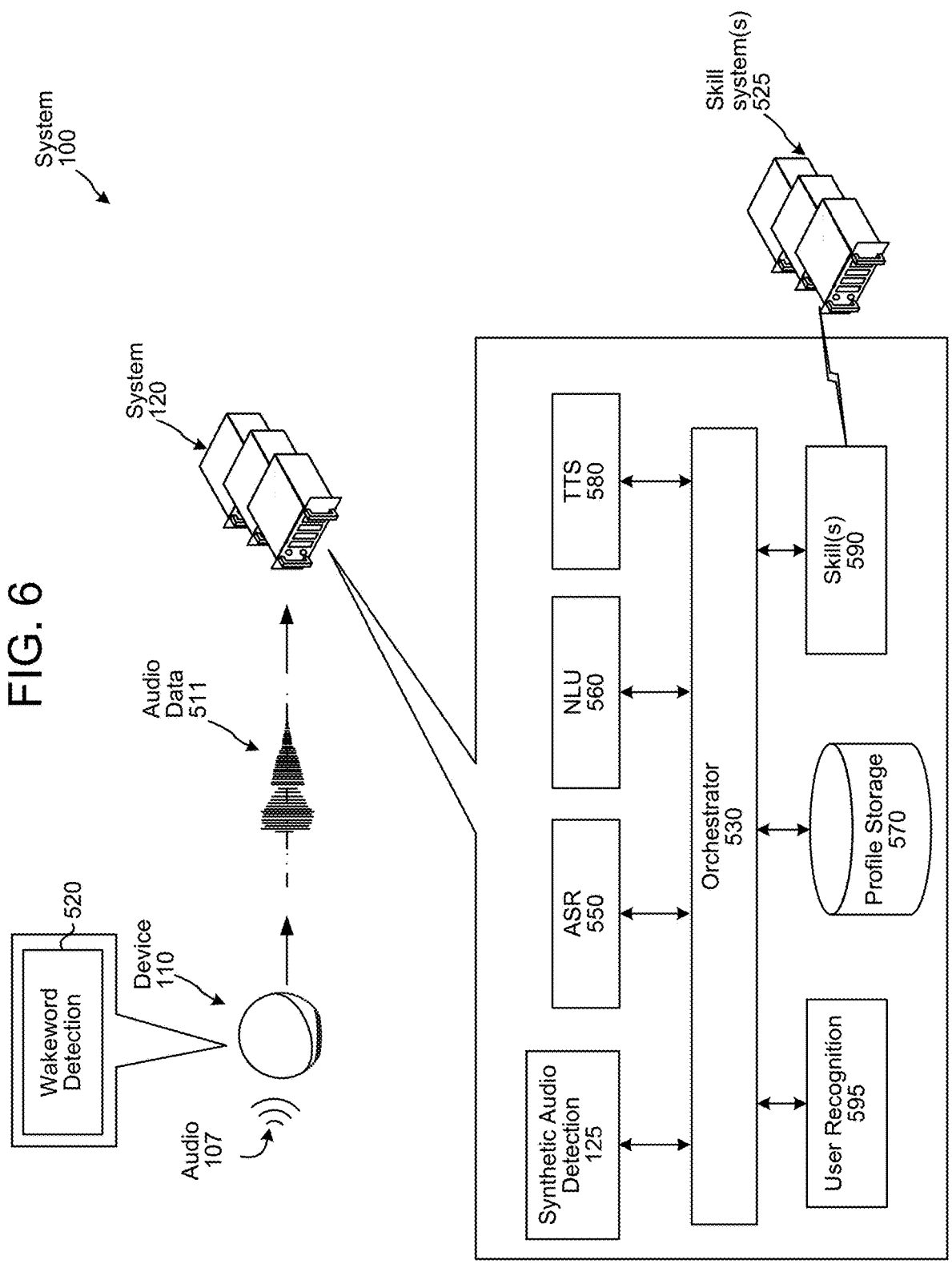

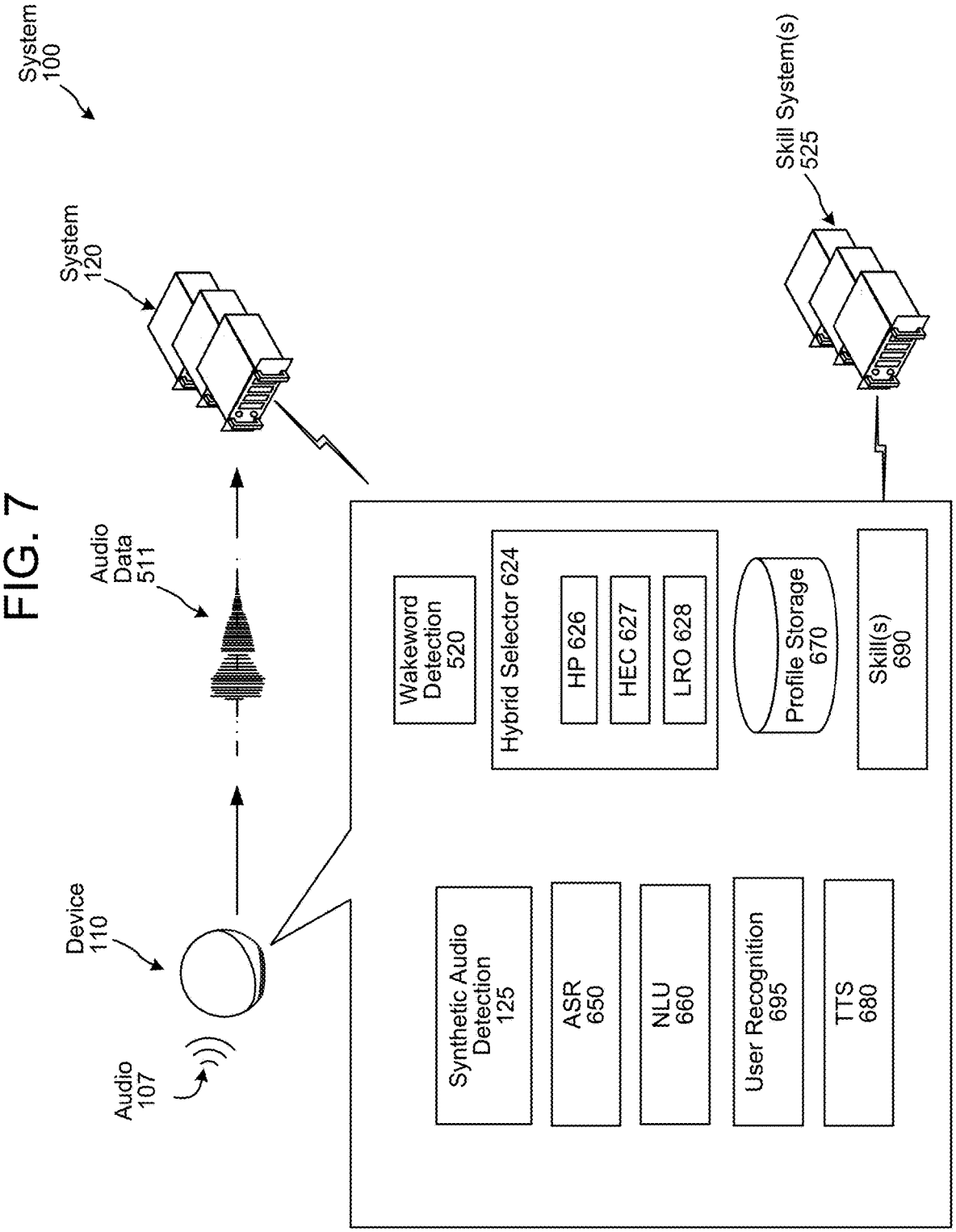

DETECTING MACHINE-OUTPUTTED AUDIO

BACKGROUND

Spoken language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6 is a conceptual diagram of components of the system, according to embodiments of the present disclosure.

FIG. 7 is a conceptual diagram illustrating components that may be included in a device, according to embodiments of the present disclosure.

DETAILED DESCRIPTION

Figure 1:
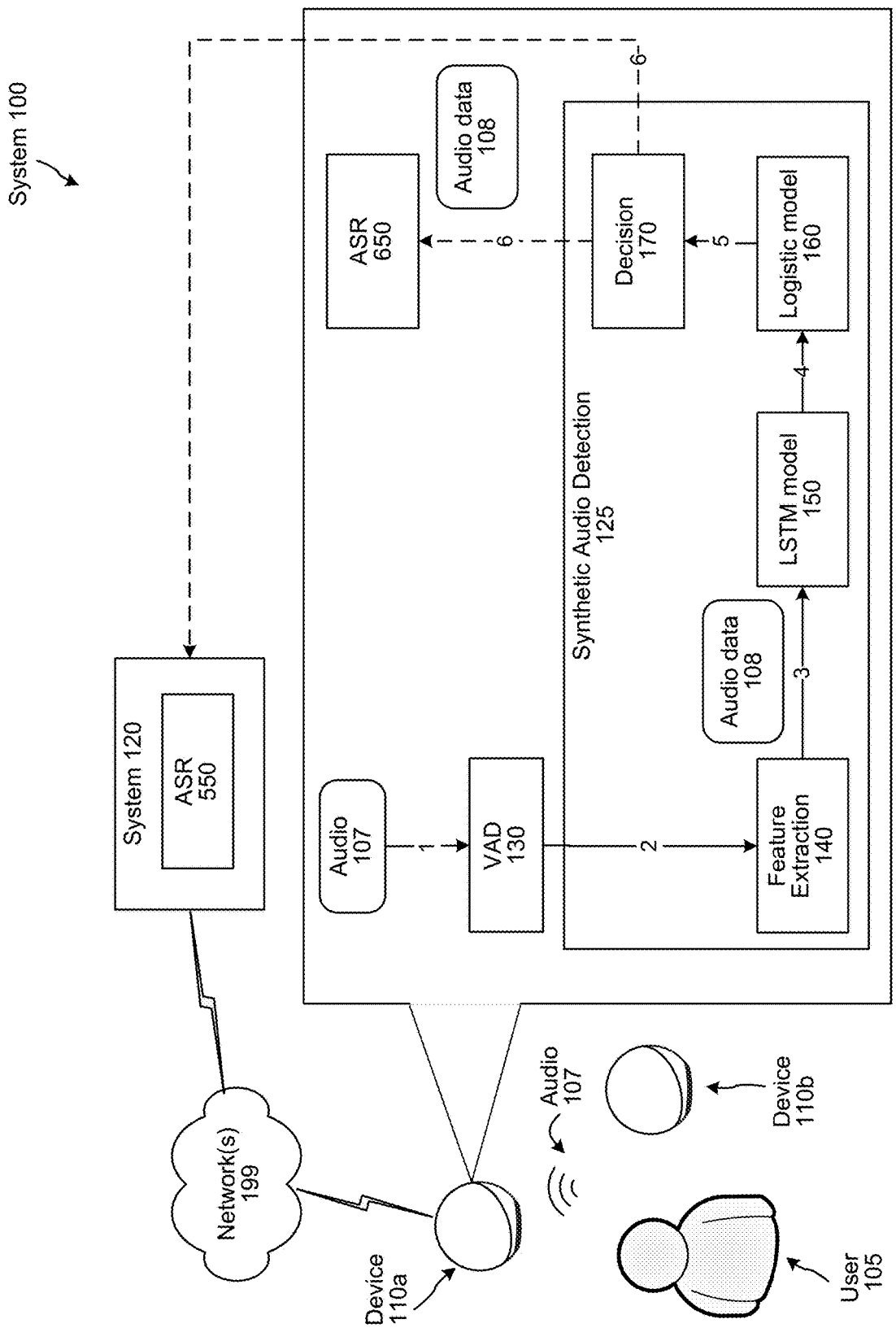
FIG. 1 is a conceptual diagram illustrating an example system for detecting machine-outputted audio, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, purchase [item]," a system may cause purchase of the indicated item. For further example, for the user input of "Alexa, enable [skill]," a system may enable the indicated skill at the device that captures the user input. In a further example, for the user input of "Alexa, send a message to [person]," a system may capture spoken message content and cause same to be output via a device registered to the indicated person.

In some cases, another device may output audio that may resemble a request from a user. The user's device may capture such audio, and perform an action as if the request was provided by a user. For example, a first smart speaker may be playing a recorded program or other content and the content may include audio such as "Alexa, purchase [item]." Even though that audio may not be spoken by a user, a second smart speaker may capture the audio, and the system may cause purchase of the indicated item. As another example, a smart TV may be playing a recorded program or other content and the content may include audio such as "Alexa, enable [skill]." Again, even though that audio may not be spoken by a user, a smart speaker may capture the audio, and the system may enable the indicated skill at the smart speaker. Thus, in certain situations machine-outputted audio (e.g., audio not spoken by a human) may result in actions being executed.

The foregoing cases may result in the system performing actions that were not actually requested by the user. This can degrade the user experience by resulting in user frustration, user confusion, etc. In such cases, it is beneficial for a device to detect when received audio is outputted by a machine and respond accordingly, including by disregarding the input gracefully (e.g., appearing from the user's perspective to "ignore" it by stopping the processing pipeline, actively acknowledging in a manner that makes sense to the user, etc.).

The present disclosure relates to, among other things, techniques for determining whether audio is machine-outputted or non-machine outputted. In some embodiments, a device or a system is configured to process, using a machine learning model, received audio data to determine audio embedding data, and process the audio embedding data, using another machine learning model, to determine if the audio data is machine-outputted. In some embodiments, the device or the system discards the audio data if it is machine-outputted (e.g., discontinues the voice interface processing, saves the audio in manner specific to machine-outputted audio, etc.). In some embodiments, the device sends the audio data to another component (e.g., a speech processing component) for processing if it is not machine-outputted. In some embodiments, the system may generate an alert indicating that the received audio was machine-outputted. Such an alert may be outputted at a user's device and/or a developer's device for further action (e.g., investigation of where the audio data came from, identification of potential malicious attack, etc.).

As used herein, machine-outputted audio refers to audio outputted by a device, for example, via a speaker(s) of the device. Machine-outputted audio includes audio corresponding to synthesized speech and recorded audio. Synthesized speech may be generated using one or more text-to-speech (TTS) techniques. Recorded audio may be a recording of speech from a person, such as, dialog for a TV show, movie, radio, or commercial, playback of a voice message or song, etc. As used herein, non-machine-outputted audio refers to live (non-recorded) speech from a user.

In some embodiments, the system uses machine-outputted audio to respond to a spoken input from a user. The system may receive first audio data corresponding to machine-outputted audio, the system may store the first audio data for a period of time, and the system may then receive second audio data corresponding to an input spoken by a user. The system may determine that the input spoken by the user relates to the machine-outputted audio. For example, the first audio data may correspond to audio outputted by a TV for a TV show, and the second audio data may correspond to the user input "Alexa, what is this show about?" In this example, the system may determine that the user is asking about the show being outputted by the TV, which was captured within the first audio data. The system may respond to the user input based on the machine-outputted audio (e.g., determine intent data, entity data, output data responsive to the user input, etc.).

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 shows a system 100 configured to determine whether received audio is machine-outputted or non-machine-outputted. As shown in FIG. 1, the system 100 may include multiple devices, such as a device 110a and a device 110b, in communication with a system 120 across one or more networks 199. The network(s) 199 may include the Internet and/or any other wide- or local-area network, and may include wired, wireless, and/or cellular network hardware. The devices 110 may be located in the same environment (e.g., a household, office space, hotel room/suite, outdoor living area, store, lobby area, reception area, vehicle, classroom, etc.). The devices 110 may be in acoustic proximity to each other such that one of the devices 110 may be able to capture audio generated by another one of the devices 110 (and vice-versa). In some cases, a user 105 may be located within the same environment as the devices 110. Although the figures and discussion of the present disclosure illustrate certain devices and components, there may be fewer or more devices and components implemented by the system 100 without departing from the present disclosure.

Figure 8:
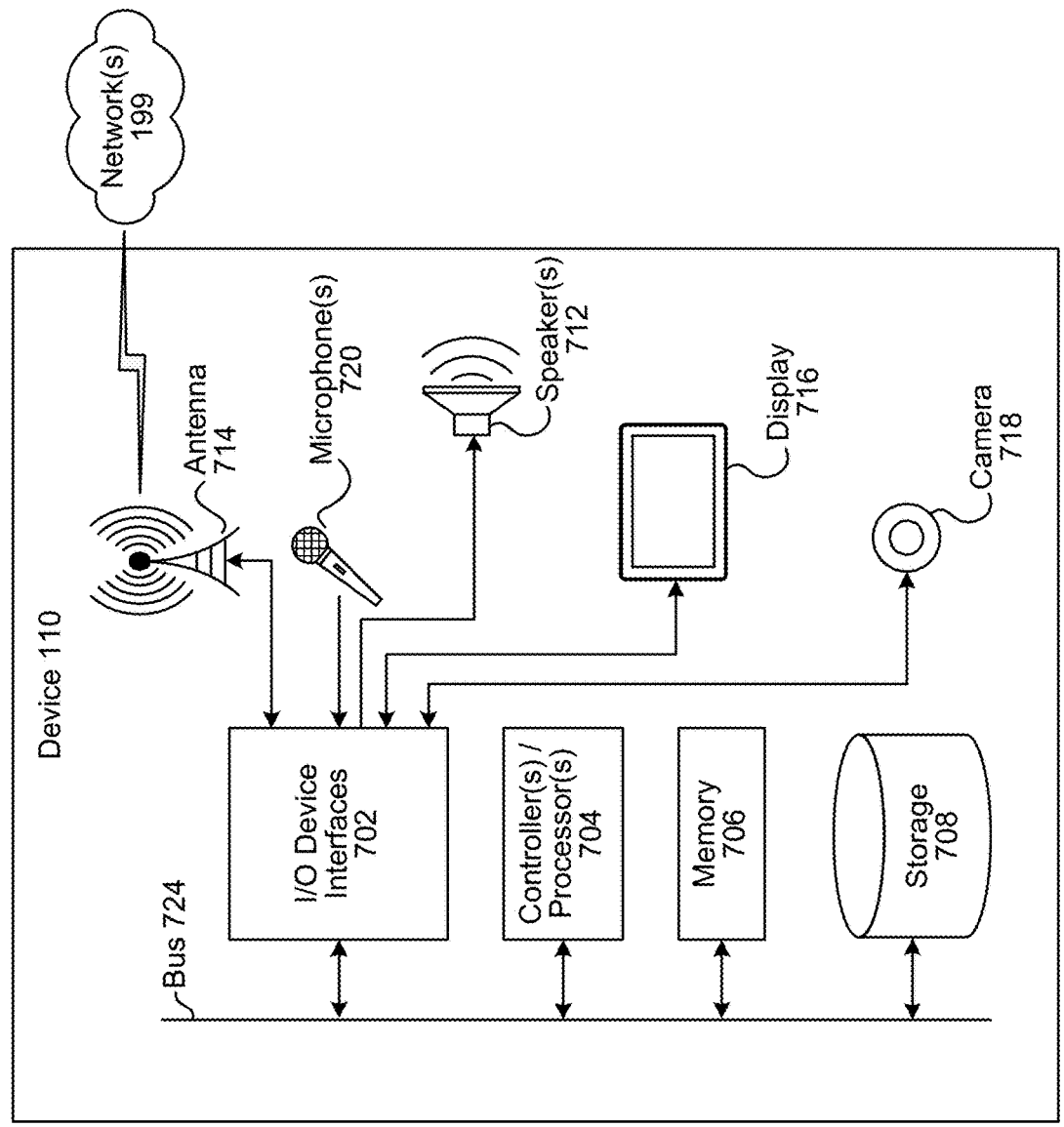
FIG. 8 is a block diagram conceptually illustrating example components of a device, according to embodiments of the present disclosure.

In some cases, the device 110a may capture audio using one or more microphones (e.g., microphone(s) 720 shown in FIG. 8) associated with the device 110a. The device 110a may include a synthetic audio detection component 125 configured to determine whether the received audio is machine-outputted or non-machine-outputted, and taking appropriate steps for processing the received audio. The device 110a may also include one or more other components that may be configured to process user inputs and generate output data responsive to the user inputs. Such components are shown and described in relation to FIG. 7. One example component may an ASR component 650, as shown in FIG. 1.

The device 110a may capture audio 107. The audio 107 may be outputted by the device 110b using one or more speakers (e.g., speaker(s) 712 shown in FIG. 8) associated with the device 110b. The audio 107 outputted by the device 110b may be synthesized speech or recorded audio. Alternatively, the audio 107 may correspond to speech from the user 105. In either case, the audio 107 may correspond to one or more words. Upon receipt of the audio 107, the device 110a may process the audio 107 using the synthetic audio detection component 125 to determine whether the audio 107 is machine-outputted (e.g., by the device 110b) or non-machine-outputted (e.g., by the user 105).

In some embodiments, prior to processing the audio 107 using the synthetic audio detection component 125, the device 110a may send (step 1) the audio 107 to a voice activity detection (VAD) component 130. The VAD component 130 may be configured to determine whether the audio 107 includes speech (e.g., one or more words, sounds that resemble words, etc.). The VAD component 130 may use various techniques. Such techniques may determine whether speech is present in the audio 107 based on various quantitative aspects of the audio 107, such as the spectral slope between one or more frames of the audio 107, the energy levels of the audio 107 in one or more spectral bands, the signal-to-noise ratios of the audio 107 in one or more spectral bands, or other quantitative aspects. In other examples, the VAD component 130 may implement a classifier configured to distinguish speech from background noise. The classifier may implement techniques such as linear classifiers, support vector machines, and decision trees. In yet other examples, the VAD component 130 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio.

In some embodiments, if the VAD component 130 determines that the audio 107 includes speech, then the audio 107 may be processed by the synthetic audio detection component 125. If the audio 107 does not include speech (e.g., the audio 107 may include noise/sounds other than words), then the audio 107 may not be processed by the synthetic audio detection component 125. In some embodiments, when the audio 107 includes speech, the VAD component 130 may remove silences from the audio 107 before sending to the synthetic audio detection component 125. For example, the VAD component 130 may output processed audio that corresponds to the audio 107 without one or more frames that correspond to silence.

The synthetic audio detection component 125 may include a feature extraction component 140, a Long Short-Term Memory (LSTM) model 150, a logistic model 160, and a decision component 170. The VAD component may send (step 2) the audio 107 or the processed audio (determined by the VAD component 130) to the feature extraction component 140 for processing. The feature extraction component 140 may determine log Mel-filterbank energy values (LFBE) features corresponding to the audio 107. The LFBE features may be included in audio data 108 outputted by the feature extraction component 140. The feature extraction component 140 may use various techniques to determine the LFBE features from an audio waveform. In some embodiments, the feature extraction component 140 may perform a windowing function on the audio 107 to determine overlapping audio frames. The size of the audio frame and the window size may depend on system configurations. In a non-limiting example, the feature extraction component 140 may determine a first audio frame to include twenty-five milliseconds of the audio 107, and may determine the next/second audio frame, by sliding a window of 10 milliseconds, to include 15 milliseconds of the first audio frame and the next 10 milliseconds of the audio 107. In some embodiments, the feature extraction component 140 may perform a Fast Fourier Transform (FFT) on each audio frame of the audio 107 to convert the audio frame from its original time domain to a representation in a frequency domain. The feature extraction component 140 may then calculate a power spectrum using the frequency domain representations of the audio frames of the audio 107, and then calculate the LFBE features using the power spectrum. Other audio processing techniques may be implemented by the feature extraction component 140 to determine the audio data 108.

In some embodiments, the synthetic audio detection component 125 may apply feature normalization techniques to the processed audio outputted by the VAD component 130, and the normalized processed audio may be sent to the feature extraction component 140 for processing. The feature normalization technique may be based on mean-variance, standard deviation, mean values, median values, etc. The feature normalization technique may scale the feature values (e.g., signal values in the audio 107).

The feature extraction component 140 may send (step 3) the audio data 108 to the LSTM model 150 for processing. The LSTM model 150 may be configured to determine audio embedding data corresponding to the audio data 108. In some embodiments, the LSTM model 150 may include three processing layers, with a hidden state dimension of 1200 and a projection layer dimension of 400. In other embodiments, the LSTM model 150 may include three processing layers, with a hidden state dimension of 768 and a projection layer dimension of 256. Other dimensions may be implemented based on model configurations.

In some embodiments, each time step in the LSTM model 150 may take an input and the previous embedding outputted during the previous time step, and may produce a set of weights matching the dimension of a cell state. As a result, weight matrices of size (input dimension×cell state dimension) and (embedding dimension×cell dimension) are produced.

In some embodiments, a dimensionality reduction technique is applied to the embedding data outputted by the final layer of the LSTM model 150. Such dimensionality reduction technique may include a linear projection.

In some embodiments, a forget gate bias for the LSTM model 150 may be initialized (e.g., using 0, 1, or 2 as the bias value). In some embodiments, for the LSTM model 150 to learn dependencies within long sequences, as audio data, the forget gate bias may be initialized to a value greater than 0. This enables the LSTM model 150 to retain all/most of its memory each step, and to then incrementally learn to forget information as needed.

In some embodiments, model weights for the LSTM model 150 may be initialized to orthogonal matrices. The eigenvalues of an orthogonal matrix may stop the gradient of the LSTM model 150 from vanishing or exploding over any number of time steps.

In some embodiments, the LSTM model 150 may be trained (or configured) using semi-supervised techniques (or self-supervised techniques) and training data that includes various audio data. In the training data, some of the audio data may be labeled, while the remaining audio data may be unlabeled. The labeled audio data may not identify which audio data corresponds to machine-outputted audio and which corresponds to user-generated audio. In some embodiments, the LSTM model 150 may be trained using audio data that is labeled with a user identifier (e.g., a user profile identifier, a user name, etc.).

In other embodiments, the synthetic audio detection component 125 may include, instead of the LSTM model 150, another type of trained model, such as another type of a recurrent neural network (RNN) model or another type of deep learning neural network (DNN) model.

The LSTM model 150 may send (step 4) the audio embedding data to the logistic model 160. In some embodiments, the logistic model 160 may be a logistic regression model. The logistic model 160 may be configured to determine whether the audio 107 is machine-outputted or non-machine-outputted based on the audio embedding data. The logistic model 160 may transform its output using a logistic sigmoid function to return a probability value.

In some embodiments, the logistic model 160 may be trained (or configured) using supervised training techniques and training data that includes various labeled audio embedding data. For example, the training data may include first audio embedding data that is labeled as machine-outputted audio, second audio embedding data that is labeled as non-machine-outputted audio, third audio embedding data that is labeled as machine-outputted audio, etc. The audio embedding data, to be included in the training data, may be generated using the LSTM model 150.

In some embodiments, the logistic model 160 may output data indicating whether the audio 107 is machine-outputted or non-machine-outputted. In some embodiments, the logistic model 160 may output a numerical value (e.g., a confidence score, a probability, etc.) representing a likelihood that the audio 107 is machine-outputted. For example, the numerical value may be between 0 and 1, and if the numerical value is closer to 1, then the audio 107 may be machine-outputted, whereas if the numerical value is closer to 0, then the audio 107 may be non-machine-outputted. Alternatively, depending on the configuration of the logistic model 160, if the numerical value is closer to 0 then the audio 107 may be machine-outputted, whereas if the numerical value is closer to 1 then the audio 107 may be non-machine-outputted. In other embodiments, the logistic model 160 may output a label indicating whether the audio 107 is machine-outputted or non-machine-outputted. For example, the label may be a Boolean value, such as, "true" or "false", "yes" or "no", "0" or "1", etc. Depending on the logistic model 160 configuration, one Boolean value may be associated with machine-outputted audio, and the other Boolean value may be associated with non-machine-outputted audio. In some embodiments, the logistic model 160 may determine the label based on binning a confidence score or probability value determined based on processing the audio embedding data. In some embodiments, the data indicating whether the audio 107 is machine-outputted or non-machine-outputted may include both a label and a numerical value (e.g., a confidence score or a probability value).

In some embodiments, the logistic model 160 may be a binary classification model configured to determine whether the audio 107 is machine-outputted or not. In other embodiments, the logistic model 160 may be a binary classification model configured to determine whether the audio 107 is user-generated (live speech from a user) or not.

In some embodiments, the logistic model 160 may be configured to classify the audio 107, based on processing the audio embedding data corresponding to the audio 107, into one of multiple categories. In example embodiments, the following three categories: non-machine-outputted audio, synthesized speech audio, and recorded audio. Depending on which category the audio 107 is classified into, the system 100 may perform different steps as described herein below. In such embodiments, the logistic model 160 may be trained using training data that includes various labeled audio embedding data, where each audio embedding data may be labeled as corresponding to one of the multiple categories (e.g., non-machine-outputted audio, synthesized speech, or recorded audio).

In some embodiments, the synthetic audio detection component 125 may include, instead of the logistic model 160, another type of trained model, such as a classifier model or another type of statistical model.

The logistic model 160 may send (step 5) the data (e.g., numerical value and/or label) indicating whether the audio 107 is machine-outputted or non-machine-outputted to the decision component 170. The decision component 170 may be configured to perform one or more steps based on the logistic model 160 indicating that the audio 107 is machine-outputted, and may be configured to perform one or more other steps based on the logistic model 160 indicating the audio 107 is non-machine-outputted.

In the case that the audio 107 is machine-outputted (e.g., outputted by the device 110*b*), the decision component 170 may discard the audio 107 and the audio data 108, and may not send the audio 107 or the audio data 108 to another component for further processing. In this manner, the decision component 170 may stop the system 100 from processing and responding to machine-outputted audio.

In the case that the audio 107 is non-machine-outputted (e.g., live speech from the user 105), the decision component 170 may send (step 6) the audio data 108 to another component for further processing. As shown in FIG. 1, in some example embodiments, the decision component 170 may send the audio data 108 to the ASR component 650 (included at the device 110*a*) for further processing. In other example embodiments, the decision component 170 may send the audio data 108 to an ASR component 550 included at a system 120, where the device 110*a* may be in communication with the system 120 via the network(s) 199. In yet other example embodiments, the decision component 170 may send the audio data 108 to both of the ASR component 650 and the ASR component 550. In sending the audio data 108, the decision component 170 is sending the LFBE features corresponding to the audio 107. The ASR component 650/550 may be configured to determine ASR data corresponding to the audio data 108 as described below. In this manner, the decision component 170 may enable processing with respect to the audio 107 when it includes speech from a user.

In some embodiments, the audio 107 may correspond to an entire utterance (e.g., one or more sentences), such as "Alexa, purchase that item" or "Alexa, enable [skill]". In other embodiments, the audio 107 may correspond to a portion of an utterance (e.g., a beginning of a sentence, a wakeword included in the utterance), such as "Alexa." The synthetic audio detection component 125 may be configured to process audio corresponding to an entire utterance or to a portion of an utterance.

The synthetic audio detection component 125 may be language-agnostic. That is, the synthetic audio detection component 125 may be able to determine whether audio is machine-outputted or non-machine-outputted regardless of which natural language (e.g., English, Hindi, German, etc.) is included in the audio. This may be possible because the synthetic audio detection component 125 is configured to use audio features corresponding to the audio, and is not based on words included in the audio.

The synthetic audio detection component 125 may be able to detect machine-outputted audio which may be outputted by the device 110*b* in the form of synthesized speech. There are various TTS techniques for generating synthesized speech. There may also be various voice profiles used to generate the synthesized speech. The synthesized speech outputted by the device 110*b* may be generated using a first TTS technique based on the device/system configuration. Another device 110*c* may generate synthesized speech using a second TTS technique. The synthetic audio detection component 125 may be able to determine that the synthesized speech is machine-outputted regardless of the TTS technique or the voice profile used to generate the synthesized speech. This may be based on synthesized speech and certain TTS techniques having particular characteristics (e.g., acoustic patterns, acoustic features, etc.) that differentiate synthesized speech from user/human speech. The audio embedding data outputted by the LSTM model 150 may be able to capture data corresponding to such characteristics, and the logistic model 160 may be able to classify the audio based on whether such characteristics exist in the audio.

In some embodiments, the device 110*a* may include a wakeword detection component 520 shown in FIG. 6. The wakeword detection component 520 may be configured to determine whether audio captured by the device 110*a* is directed to the device 110 or the system 120. One of the ways the wakeword detection component 520 may make this determination is by determining whether the audio 107 includes speech representing a wakeword. In some embodiments, the wakeword detection component 520 may only process the audio 107 if the VAD component 130 determines that the audio 107 includes speech.

In some embodiments, the synthetic audio detection component 125 may only process if the wakeword detection component 520 determines that the audio 107 includes speech directed to the device 110 or the system 120 (e.g., includes a wakeword such as "Alexa"). In other embodiments, the synthetic audio detection component 125 may process in parallel to the wakeword detection component 520, so that while the wakeword detection component 520 determines whether the audio 107 is directed to the device 110 or the system 120, the synthetic audio detection component 125 determines whether the audio 107 is machine-outputted or non-machine-outputted. In some embodiments, if the synthetic audio detection component 125 determines that the audio 107 is machine-outputted, the decision component 170 may cause the wakeword detection component 520 to stop processing (e.g., by sending a command to the wakeword detection component 520, by sending data indicating that the audio 107 is machine-outputted, etc.).

Figure 2:
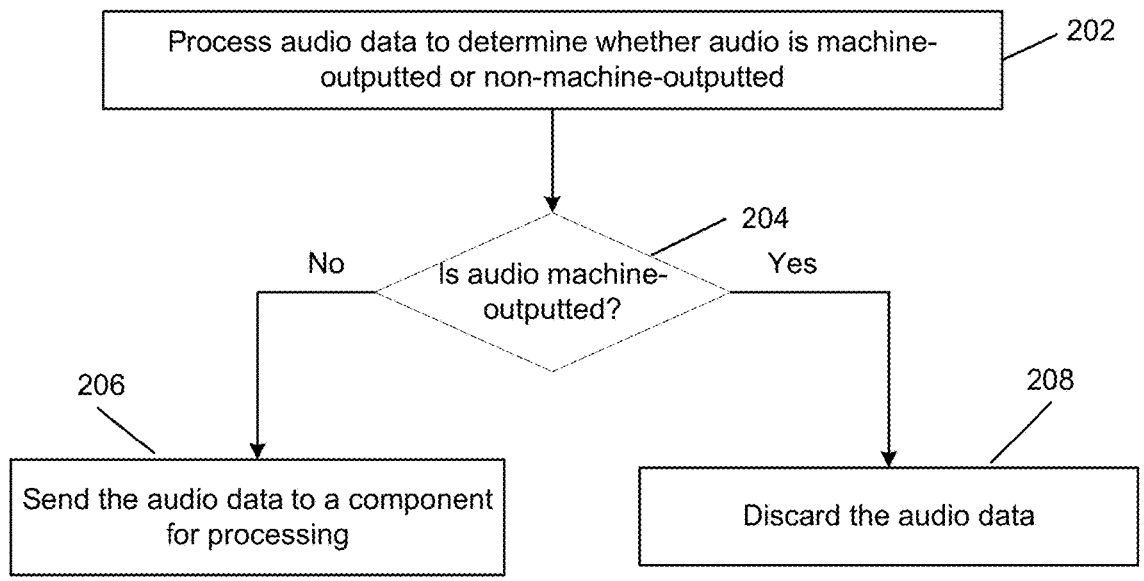
FIG. 2 is a flowchart illustrating an example processing of audio data based on whether the audio data is machine-outputted or non-machine-outputted, according to embodiments of the present disclosure.

FIG. 2 illustrates an example process that may be performed by the synthetic audio detection component 125. At a step 202, the synthetic audio detection component 125 may process the audio data 108 to determine whether the audio 107 is machine-outputted or non-machine-outputted. The synthetic audio detection component 125 may process the audio data 108 as described above in relation to FIG. 1, for example, using the LSTM model 150 and the logistic model 160, where the output of the logistic model 160 may indicate whether the audio 107 is machine-outputted audio or non-machine-outputted audio. At a decision step 204, the synthetic audio detection component 125 may determine if the audio 107 is machine-outputted.

If the audio 107 is not machine-outputted, then at a step 206, the synthetic audio detection component 125 may send the audio data 108 to a component for processing. The synthetic audio detection component 125 may send the audio data 108 to more than one component for processing. The synthetic audio detection component 125 may send the audio data 108 to components included in the device 110*a* (shown in FIG. 7), components included in the system 120 (shown in FIG. 6), or to both. Example components that the synthetic audio detection component 125 may send the audio data 108 include the ASR component 550/650, the wakeword detection component 520, a user recognition component 595/695 or other components. If the audio 107 is machine-outputted (determined at the decision step 204), then at a step 208, the synthetic audio detection component 125 may discard the audio data 108. For example, the audio data 108 (and/or the audio 107) may be deleted from a storage/memory of the device 110*a* (or the device 110 that received the audio 107). Additionally or alternatively, the audio data 108 (and/or the audio 107) may be sent to another component/system for storage and use for future training or processing. Machine-outputted audio may be used to configure components of the device 110 and the system 120. For example, machine-outputted audio may be used to train the synthetic audio detection component 125, the ASR component 550/650, the skill component 590/690 (for using the machine-outputted audio to respond to spoken inputs from the user 105), etc.

In a non-limiting example referring to the processing shown in FIG. 2, the device 110*a* may receive audio 107 based on the device 110*b* outputting synthesized speech corresponding to "Alexa, make payment." The synthetic audio detection component 125 may determine that the audio 107 is machine-outputted, and may discard the audio data 108 corresponding to the audio 107 without performing further processing. In another non-limiting example, the device 110*a* may receive audio 107 based on the device 110*b* outputting recorded audio corresponding to a commercial which may include the following words "just say Alexa, play my list." The commercial may provide information on how to interact with the device 110 or with a skill component. The synthetic audio detection component 125 may determine that the audio 107 is machine-outputted, and may discard the audio data 108 corresponding to the audio 107 without performing further processing. In this manner, the device 110*a* does not process and respond to machine-outputted audio, thus avoiding performance of undesired actions or actions that were not specifically requested by the user 105.

Figure 3:
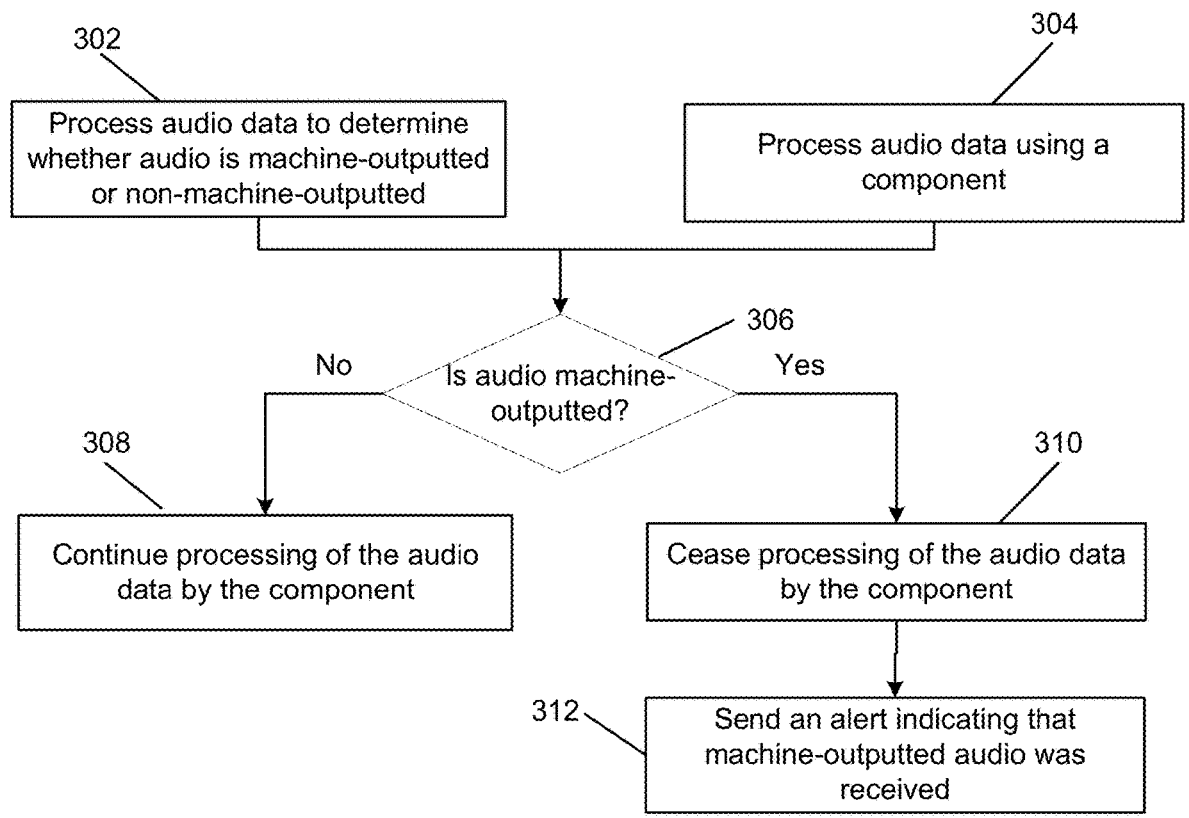
FIG. 3 is a flowchart illustrating another example processing of audio data based on whether the audio data is machine-outputted or non-machine-outputted, according to embodiments of the present disclosure.

FIG. 3 illustrates an example process that may be performed by the device 110*a*. At a step 302, the synthetic audio detection component 125 may process the audio data 108 to determine whether the audio 107 is machine-outputted or non-machine-outputted. The synthetic audio detection component 125 may process the audio data 108 as described above in relation to FIG. 1, for example, using the LSTM model 150 and the logistic model 160, where the output of the logistic model 160 may indicate whether the audio 107 is machine-outputted audio or non-machine-outputted audio.

At a step 304, the device 110*a* may process the audio data 108 using a component. The device 110*a* may process the audio data 108 using another component while the synthetic audio detection component 125 process the audio data 108. The device 110*a* may process the audio data 108 using the wakeword detection component 520 or the ASR component 650 (or another component). At a decision step 306, the synthetic audio detection component 125 determines if the audio 107 is not machine-outputted. If the audio 107 is not machine-outputted, then the device 110*a* may continue (step 308) processing of the audio data 108 by the component (e.g., the wakeword detection component 520, the ASR component 650, etc.). If the audio 107 is machine-outputted, then the device 110*a* may cease (step 310) processing of the audio data 108 by the component (e.g., the wakeword detection component 520 or the ASR component 650). In some embodiments, the synthetic audio detection component 125 may generate output data (e.g., a command, an indication, etc.) that causes the device 110*a* to stop processing using the component. At a step 312, the device 110*a* may send an alert indicating that machine-outputted audio was received. The alert may be sent to the system 120 or another system. Additionally or alternatively, the alert may be sent to another device 110 associated with the user 105. The alert may be text data, audio data (corresponding to synthesized speech, sounds, etc.), image data, video data, notification data, message data (e.g., an email message, a Short Message Service (SMS) message, etc.), or other type of data.

In some embodiments, in addition to or in alternative of sending the alert to another device 110 associated with the user 105, the device 110*a* (or the system 120) may send output data requesting confirmation or permission to process the machine-outputted audio 107. The output data may be audio data representing synthesized speech or may be text data representing a natural language output. The output data may inform the user 105 that machine-outputted audio was received at the device 110*a*, and may request the user 105 to provide an input if a request included in the machine-outputted audio is to be processed. For example, the device 110*a* may output audio or text representing "machine-outputted audio was received. Do you want to process the request?" If the user 105 responds "yes" or with another affirmative response, then the device 110*a* may process the machine-outputted audio using one or more components included in the device 110*a* and/or the system 120. In some embodiments, the device 110*a* (that captured the machine-outputted audio 107) may present the output data requesting confirmation or permission from the user 105 to process the machine-outputted audio. Additionally or alternatively, another device 110 may present the output data requesting the confirmation or the permission.

In some embodiments, in response to receiving the alert, the system 120 or another system may process the audio 107 and/or the audio data 108 to determine which device generated the audio. In some cases, the audio 107 may be outputted based on a skill component 590/690 sending a command to the device 110*b* to output the audio 107. In such cases, the system 120 may determine which skill component 590/690 caused output of the audio 107. In some embodiments, the system 120 may determine whether the machine-outputted audio included synthesized speech or recorded audio, and may determine whether output of the machine-outputted audio is to be treated as a security threat or invasion of privacy. For example, if the machine-outputted audio is synthesized speech, then the system 120 may treat that as a security threat. As another example, if the machine-outputted audio is recorded audio, then the system 120 may not treat it as a security threat. In some embodiments, the system 120 may determine whether the machine-outputted audio corresponds to content that the user 105 is accessing via the device 110*b*. For example, via the device 110*b*, the user 105 may be watching a movie or a commercial, the user 105 may be listening to a podcast, etc., which may result in the device 110a receiving the audio 107. In such cases, the system 120 may determine the machine-outputted audio to not be a security threat.

In some embodiments, the system 120 or another system may, based on receiving the alert (step 312), update data and/or components corresponding to a commercial. For example, the device 110a may capture output of a commercial by a TV, which may be identified as speech/voice activity included audio. Using the alert and the machine-outputted audio, data and/or components may be updated so that output of that commercial in the future is not captured by the device 110a. For example, some watermark audio data (or other type of data/indicator) may be included in the commercial audio that may indicate to the device 110a/the system 120 that the machine-outputted audio is a commercial.

Figure 4:
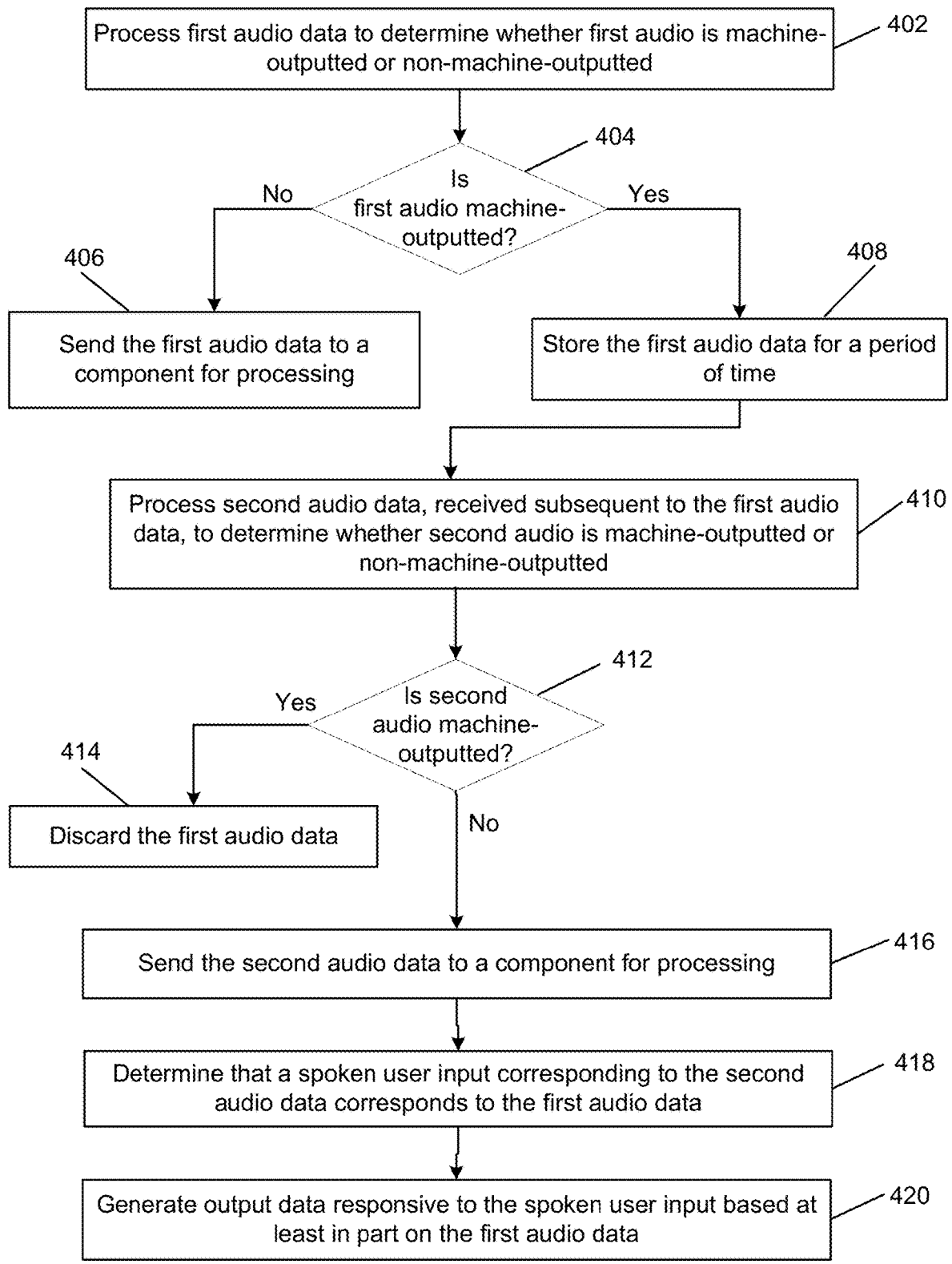
FIG. 4 is a flowchart illustrating another example processing of audio data based on whether the audio data is machine-outputted or non-machine-outputted, according to embodiments of the present disclosure.

In some embodiments, the system 100 may use previously received machine-outputted audio to process and respond to a subsequently received input from the user 105. FIG. 4 illustrates an example process that may be performed by the device 110a and/or the system 120 for such embodiments. At a step 402, the synthetic audio detection component 125 may process first audio data (e.g., audio data 108a) to determine whether first audio (e.g., audio 107a) is machine-outputted or non-machine-outputted. The synthetic audio detection component 125 may process the first audio data 108a as described above in relation to FIG. 1, for example, using the LSTM model 150 and the logistic model 160, where the output of the logistic model 160 may indicate whether the first audio 107a is machine-outputted audio or non-machine-outputted audio.

At a decision step 404, the synthetic audio detection component 125 may determine if the first audio 107a is machine-outputted. If the first audio 107a is not machine-outputted, then at a step 406, the device 110a may send the first audio data 108a to a component (e.g., the wakeword detection component 520, the ASR component 550/650, etc.) for processing. The first audio data 108a may be further processed as described below in relation to FIGS. 6 and 7 by the device 110a and/or the system 120 to determine output data responsive to a spoken input represented in the first audio 107a.

If the first audio 107a is machine-outputted, then at a step 408, the device 110a may store the first audio data 108a for a period of time. The device 110a may store the first audio data 108a at a data storage included in or associated with the device 110a. In other embodiments, the device 110a may send the first audio data 108a to the system 120 for storage. The period of time for which the first audio data 108a is stored may be depend on system configurations and/or user configurations. The period of time may be a predefined amount of time. For example, the period of time may be one minute, 30 seconds, two minutes, etc.

In some embodiments, the period of time may be determined dynamically based on various factors. One of the factors may be determining that the user 105 is accessing content via another device 110 associated with the user 105. The device 110a and/or the system 120 may determine that another device 110 is associated with the user 105 by determining that a device identifier for the other device 110 is included in a user profile, in a profile storage 570/670, for the user 105. For example, the user 105 may view content (e.g., a show, a movie, a sporting event, a commercial, etc.) via a smart TV 110g that is associated with the user 105 in the user profile. As another example, the user 105 may listen to content (e.g., an e-book, a news briefing, a radio show, a podcast, etc.) via a device with display 110f associated with the user 105 in the user profile. In such cases, the period of time the first audio data 108a is stored may depend on the type of content the user 105 is accessing, the length of the content the user 105 is accessing, and/or other information related to the content. For example, if the content is a commercial, the first audio data 108a may be stored for the length of the commercial. In other words, the first audio data 108a may be discarded after the content (e.g., commercial) is over.

Another factor used to determine the period of time the first audio data 108a is stored may be based on subsequent receipt of a user input. In some embodiments, the first audio data 108a may be stored until the device 110a receives user-generated audio (live speech) corresponding to a user input from the user 105. In some embodiments, the first audio data 108a may be discarded after determining that the subsequently received user input does not relate to the first audio 107a.

In some embodiments, the synthetic audio detection component 125 may be configured to classify received audio into a recorded audio category, a synthesized speech category, or a non-machine-outputted audio category. In some embodiments, the device 110a/the system 120 may store the first audio data 108a if the synthetic audio detection component 125 determines that the first audio 107a corresponds to the recorded audio category. Such recorded audio may correspond to playback of a movie, TV show, music, radio, podcast, commercial, etc. The device 110a/the system 120 may not store the first audio data 108a if the synthetic audio detection component 125 determines that the first audio 107a corresponds to the synthesized speech category. Synthesized speech that can trigger the device 110a to perform an action may be specifically generated for malicious reasons, and therefore, may represent a security threat.

After receiving the first audio 107a, the device 110a may receive second audio 107b. At a step 410, the synthetic audio detection component 125 may process second audio data (e.g., audio data 108b), received subsequent to the first audio data 108a, to determine whether the second audio 107b is machine-outputted or non-machine-outputted. The synthetic audio detection component 125 may process the second audio data 108b as described above in relation to FIG. 1, for example, using the LSTM model 150 and the logistic model 160, where the output of the logistic model 160 may indicate whether the second audio 107b is machine-outputted audio or non-machine-outputted audio.

At a decision step 412, the synthetic audio detection component 125 may determine if the second audio 107b is machine-outputted. If the second audio 107b is machine-outputted, then at a step 414, the device 110a may discard the first audio data 108a. For example, the audio data 108b (and/or the audio 107b) may be deleted from a storage/memory of the device 110a (or the device 110 that received the audio 107b). Additionally or alternatively, the audio data 108b (and/or the audio 107b) may be sent to another component/system for storage and use for future training or processing. For example, machine-outputted audio may be used to train the synthetic audio detection component 125, the ASR component 550/650, the skill component 590/690 (for using the machine-outputted audio to respond to spoken inputs from the user 105), etc.

If the second audio 107b is not machine-outputted, then at a step 416, the device 110a may send the second audio data 108b to a component for processing. For example, the device 110a may send the second audio data 108b to the ASR component 550/650 to determine ASR data corresponding to one or more words included in a spoken user input from the user 105.

At a step 418, the device 110a and/or the system 120 may determine that a spoken user input corresponding to the second audio data 108b corresponds to the first audio data 108a. In making this determination the device 110a/the system 120 may determine that the spoken user input (corresponding to the second audio data 108b) relates to the machine-outputted audio corresponding to the first audio data 108a. The device 110a/the system 120 may perform various steps or techniques to make this determination. In some embodiments, the device 110a/the system 120 may perform ASR processing using the first audio data 108a to determine one or more words included in the machine-outputted audio. In some embodiments, the device 110a/the system 120 may determine content of the machine-outputted audio based on the content being accessed by the user 105 via another device 110 associated with the user 105. In some embodiments, the device 110a/the system 120 may perform NLU processing using the second audio data 108b to determine NLU data corresponding to the spoken user input. The NLU data may include an intent and one or more entities (if applicable). The device 110a/the system 120 may determine that the spoken user input relates to the machine-outputted audio based on processing the NLU data (intent and/or entities) corresponding to the spoken user input with respect to the ASR data corresponding to the first audio data 108a and/or the determined content of the machine-outputted audio 107a. For example, the device 110a/the system 120 may determine whether an entity included in the spoken user input relates to the machine-outputted audio. As another example, the device 110a/the system 120 may determine whether an intent corresponding to the spoken user input relates to the machine-outputted audio.

Based on determining that the second audio data 108b corresponds to the first audio data 108a, the device 110a/the system 120, at a step 420, may generate output data responsive to the spoken user input based at least in part on the first audio data 108a. The output data may include information relating to the machine-outputted audio corresponding to the first audio data 108a. The output data may be an action performed with respect to the machine-outputted audio corresponding to the first audio data 108a. In some embodiments, the output data may be generated by a skill component 590/690. The skill component 590/690 may receive a command to generate the output data responsive to the spoken user input, where the command may include the intent corresponding to the spoken user input, and one or more entities corresponding to the spoken user input. In some embodiments, the device 110a/the system 120 may use the ASR data and/or the content information corresponding to the machine-outputted audio to determine one or more entities corresponding to the spoken user input. For example, the NLU component 560/660 may use data corresponding to the machine-outputted audio/the first audio 107a to perform entity resolution, to determine a NLU hypothesis, and/or other functionalities. The device 110a/the system 120 may also use data corresponding to the machine-outputted audio/the first audio 107a to select a skill component to be used to respond to the spoken user input.

In a non-limiting example referring to the processing shown in FIG. 4, the device 110a may receive first audio 107a based on the device 110b outputting a commercial for a first item name, the synthetic audio detection component 125 may determine that the first audio 107a is machine-outputted, and may store first audio data 108a corresponding to the first audio 107a. While the commercial is being output or shortly after the commercial is over, the user 105 may say "Alexa, add that item to my cart," and the device 110a may receive second audio 107b corresponding to the spoken input from the user 105. The synthetic audio detection component 125 may determine that the second audio 107b is non-machine-outputted (not machine-outputted). The device 110a/the system 120 may determine that the spoken input corresponding to the second audio 107b relates to the commercial corresponding to the first audio 107a. The device 110a/the system 120 may determine ASR data corresponding to the commercial. The NLU component 560/660 may determine that the following NLU data corresponding to the spoken input: {Intent:<AddToCart>; Entity Type: <Item>; Entity Name: "that item"}. The NLU component 560/660 may perform entity resolution to determine the specific entity referred to by "that item," and may use the ASR data corresponding to the commercial to determine "that item" refers to the "first item name." The device 110a/the system 120 may send a command to the skill component 590/690 to add an item associated with "first item name" to an electronic cart associated with the user 105. In this manner, received machine-outputted audio may be used to respond to a subsequently received user input.

In another non-limiting example referring to the processing shown in FIG. 4, the device 110a may receive first audio 107a based on the device 110b outputting a news briefing which may include a quote from a person (identified by [person name]), the synthetic audio detection component 125 may determine that the first audio 107a is machine-outputted, and may store first audio data 108a corresponding to the first audio 107a. While the news briefing is being output or shortly after the news briefing is over, the user 105 may say "Alexa, is what the [person name] said true?" or "Alexa, tell me more about what the [person name] said," and the device 110a may receive second audio 107b corresponding to the spoken input from the user 105. Based on the content of the news briefing, the device 110a/the system 120 may determine output data responsive to the spoken input. The output data may be, for example, additional information corresponding to the news briefing or to the quote by the [person name].

In another non-limiting example referring to the processing shown in FIG. 4, the device 110a may receive first audio 107a based on the device 110b playing a movie, the synthetic audio detection component 125 may determine that the first audio 107a is machine-outputted, and may store first audio data 108a corresponding to the first audio 107a. While the movie is being output or shortly after the movie is over, the user 105 may say "Alexa, who is lead character in this movie?" or "Alexa, tell me more about this movie," and the device 110a may receive second audio 107b corresponding to the spoken input from the user 105. Based on the movie (which may be identified from processing the first audio 107a and/or by determining content being accessed by the user 105 via the device 110b associated in the user profile with the user 105), the device 110a/the system 120 may determine output data responsive to the spoken input. The output data may be, for example, the name of the lead character of the movie, a plot summary of the movie, etc.

Although the process illustrated in FIG. 4 describes receiving a spoken user input after processing the first audio data 108a that corresponds to machine-outputted audio, a similar process may be performed if another type of user input is received after processing the first audio data 108a. For example, the device 110a may receive text data representing a natural language input that may be provided by the user 105 via a keyword (physical or touch-screen keyboard). The device 110*a*/the system 120 may determine NLU data corresponding to the text data, and may determine, in a similar manner as described above, whether the natural language input corresponds to the first audio data 108*a* that corresponds to machine-outputted audio.

In some embodiments, the synthetic audio detection component 125 may be used to determine training data for other components and systems. Components and systems that process audio data corresponding to speech may generate training data using synthesized speech components to increase the amount of data available for training. In other cases, the training data may include recorded audio. However, components and systems trained using synthesized speech or recorded audio may develop certain inherent and unintended/undesired biases. In some cases, a developer may use the synthetic audio detection component 125 to evaluate the training data. Audio data corresponding to machine-outputted audio (as determined by the synthetic audio detection component 125) may be removed from the training data if desired.

In some embodiments, the synthetic audio detection component 125 may determine that received audio 107 is generated by vibrating a microphone 720 of the device 110*a* or by influencing the microphone 720 in other ways.

Figure 5A:
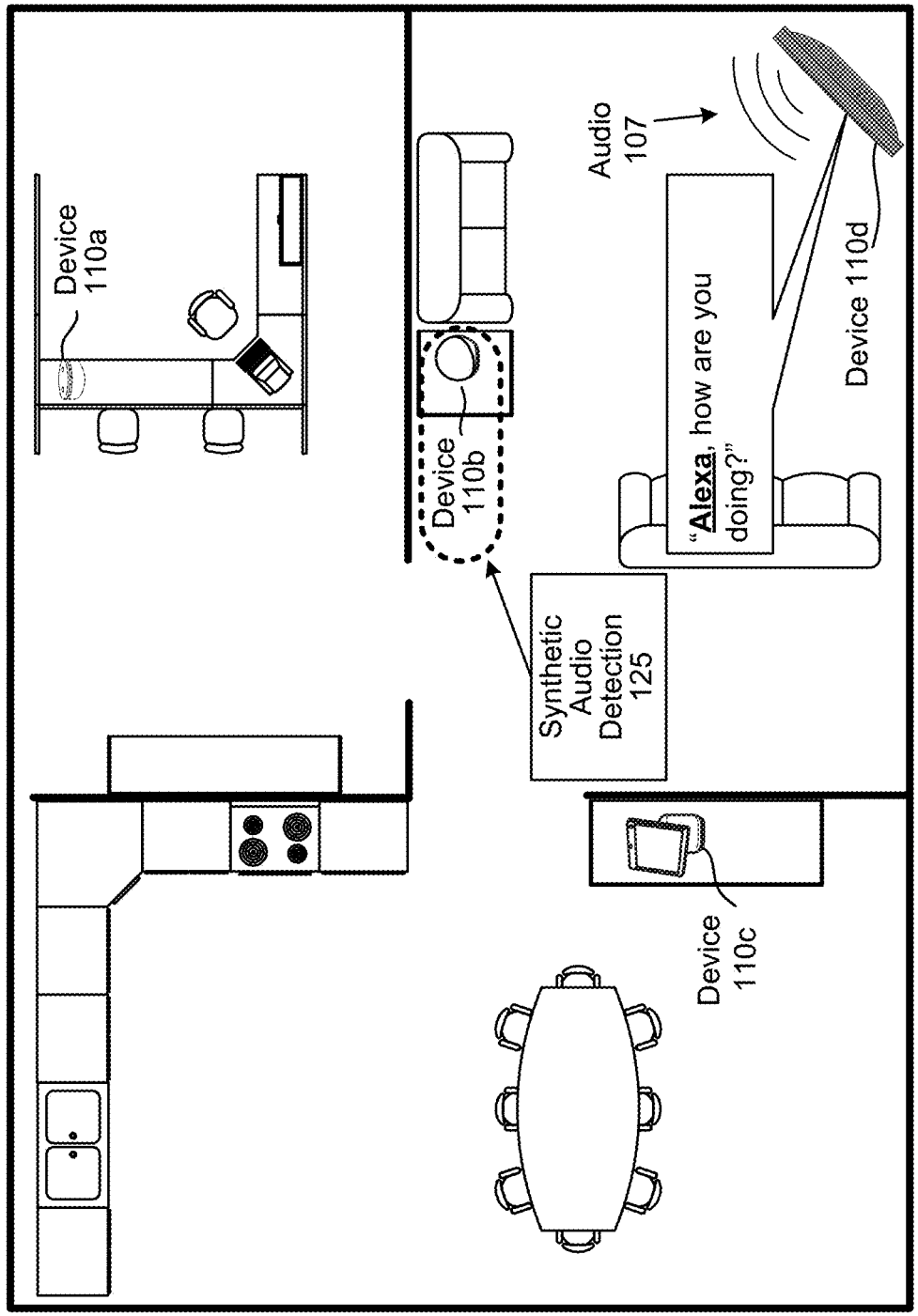
FIGS. 5A-5D illustrate examples of functionality enabled by based on determining that audio is machine-outputted or non-machine outputted, according to embodiments of the present disclosure.
Figure 5B:
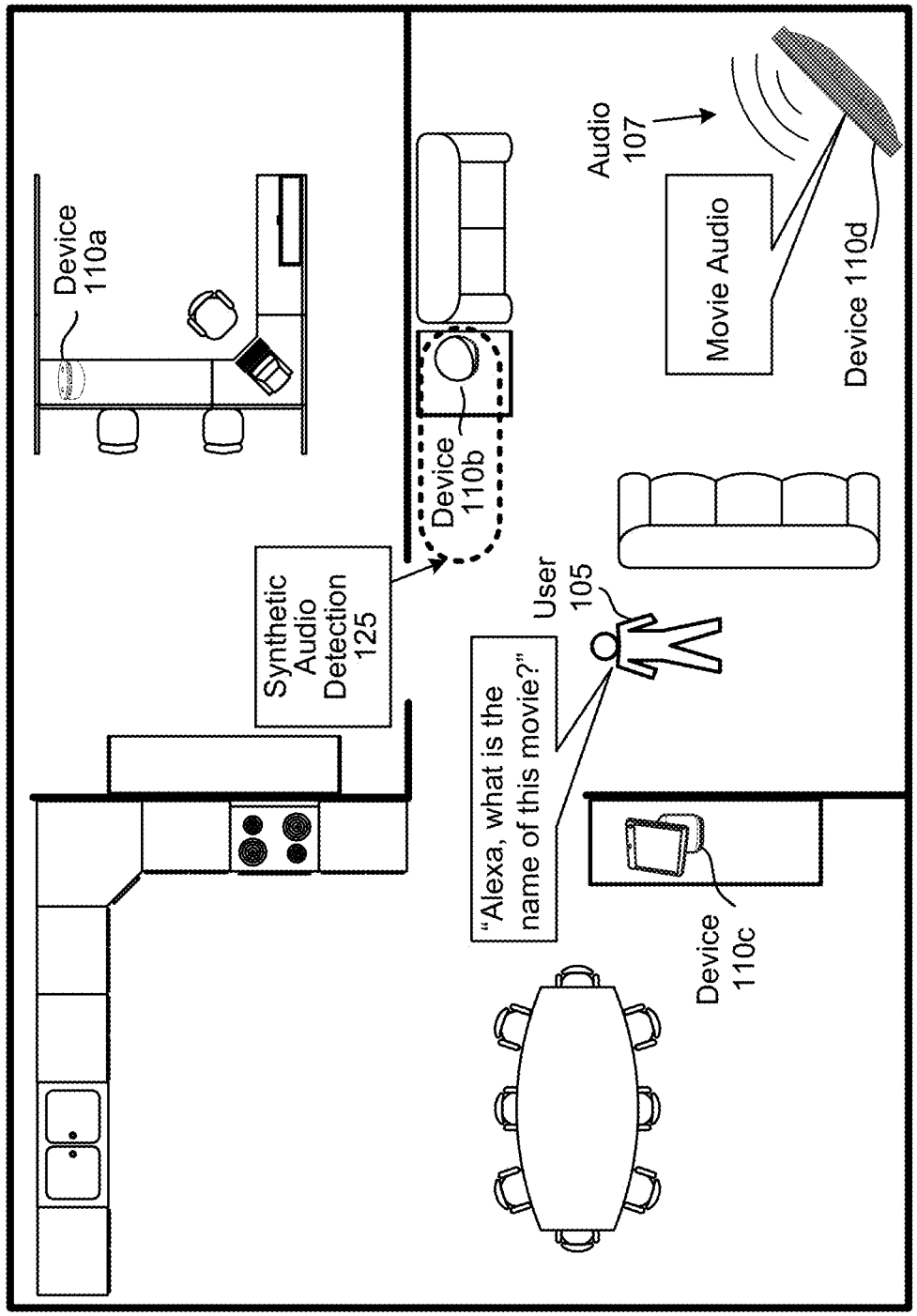
Figure 5C:
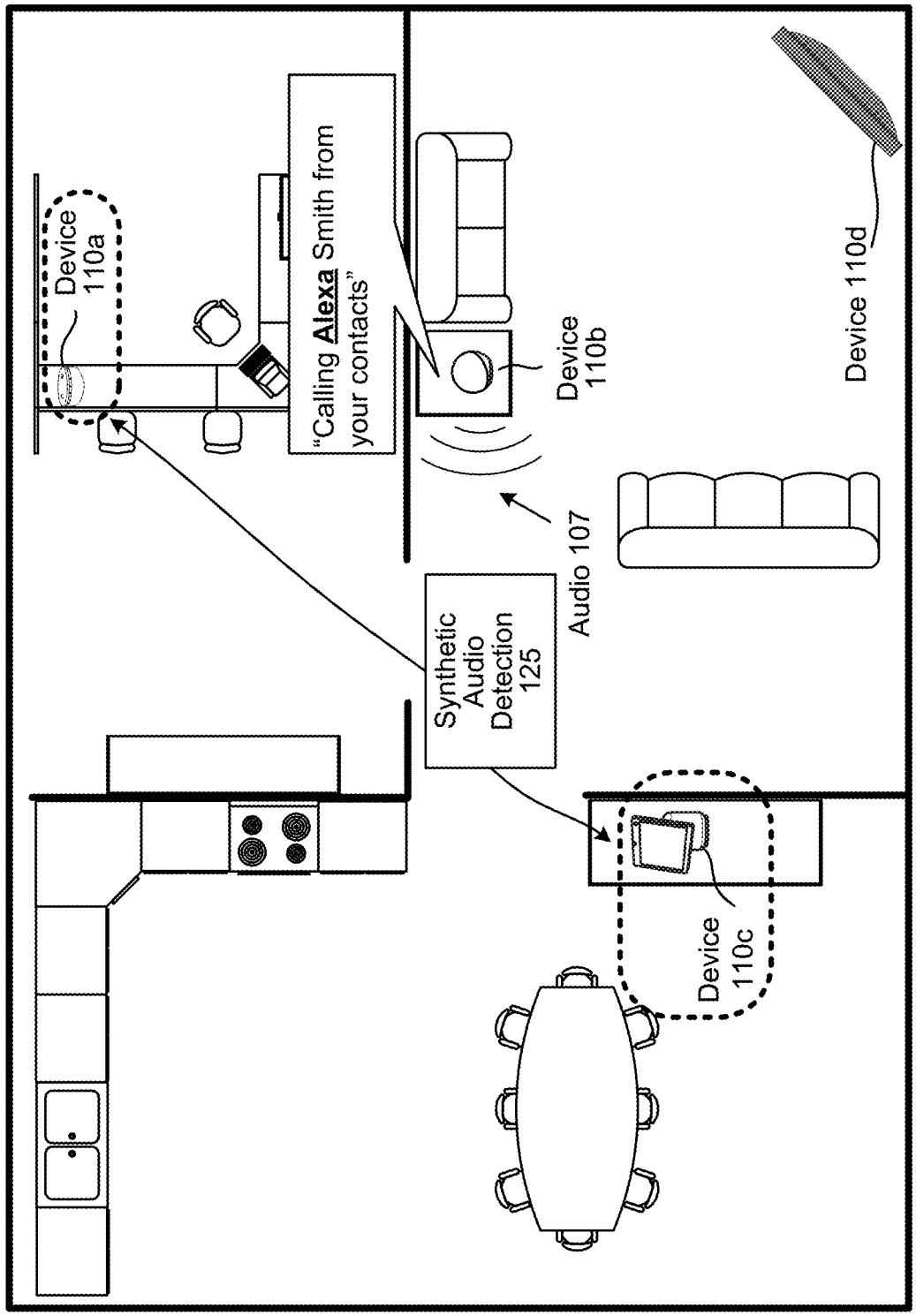

FIGS. 5A-5D illustrate functionality that may be performed based on determining that received audio is machine-outputted audio. FIGS. 5A-5C illustrate a household including multiple devices 110*a*, 110*b*, 110*c*, and 110*d*. As illustrated in FIG. 5A, the device 110*d* may output audio 107 representing "Alexa, how are you doing?" Such audio 107 may be prerecorded words that are outputted by speakers of the device 110*d*. The other devices 110, within the environment of the device 110*d*, may receive the generated audio 107. For example, the device 110*b* may receive the audio 107, and may process the audio 107 using the synthetic audio detection component 125 described herein. Based on processing the audio 107 using the synthetic audio detection component 125 (as described above in detail with respect to FIGS. 1, 2 and 3), the device 110*b* may determine that the audio 107 is machine-outputted and may determine to ignore the audio 107. That is, the device 110*b* may not perform any further processing with respect to the audio 107, and may thus not perform any action in response to "Alexa, how are you doing?" being outputted by the device 110*d*.

In another example, as illustrated in FIG. 5B, the device 110*d* may output audio 107, where the device 110*d* may be outputting a movie and the audio 107 may representing the audio corresponding to the movie. The other devices 110, within the environment of the device 110*d*, may receive the generated audio 107. For example, the device 110*b* may receive the audio 107, and may process the audio 107 using the synthetic audio detection component 125 described herein. Based on processing the audio 107 using the synthetic audio detection component 125 (as described above in detail with respect to FIGS. 1 and 4), the device 110*b* may determine that the audio 107 is machine-outputted, and may determine to store the audio 107 for some time period. After or while receiving the audio 107, the device 110*b* may receive other audio representing a spoken input from the user 105. For example, the user 105 may say "Alexa, what is the name of this movie?" Based on receiving the spoken input, the device 110*b* may use the previously stored audio 107 (machine-outputted audio) to determine a response to the spoken input, as described above in relation to FIG. 4.

In another example, as illustrated in FIG. 5C, the device 110*b* may output audio 107 representing synthesized speech. For example, the device 110*b* may output audio representing "Calling Alexa Smith from your contacts" that may be generated using one or more TTS techniques. The other devices 110*a* and 110*c*, within the environment of the device 110*b*, may receive the generated audio 107, and may process the audio 107 using the synthetic audio detection component 125 described herein. Based on processing the audio 107 using the synthetic audio detection component 125 (as described above in detail with respect to FIGS. 1, 2 and 3), the devices 110*a*, 110*c* may determine that the audio 107 is machine-outputted and may determine to ignore the audio 107. That is, the devices 110*a*, 110*c* may not perform any further processing with respect to the audio 107, and may thus not perform any action in response to "Calling Alexa Smith from your contacts" being outputted by the device 110*b*.

Figure 5D:
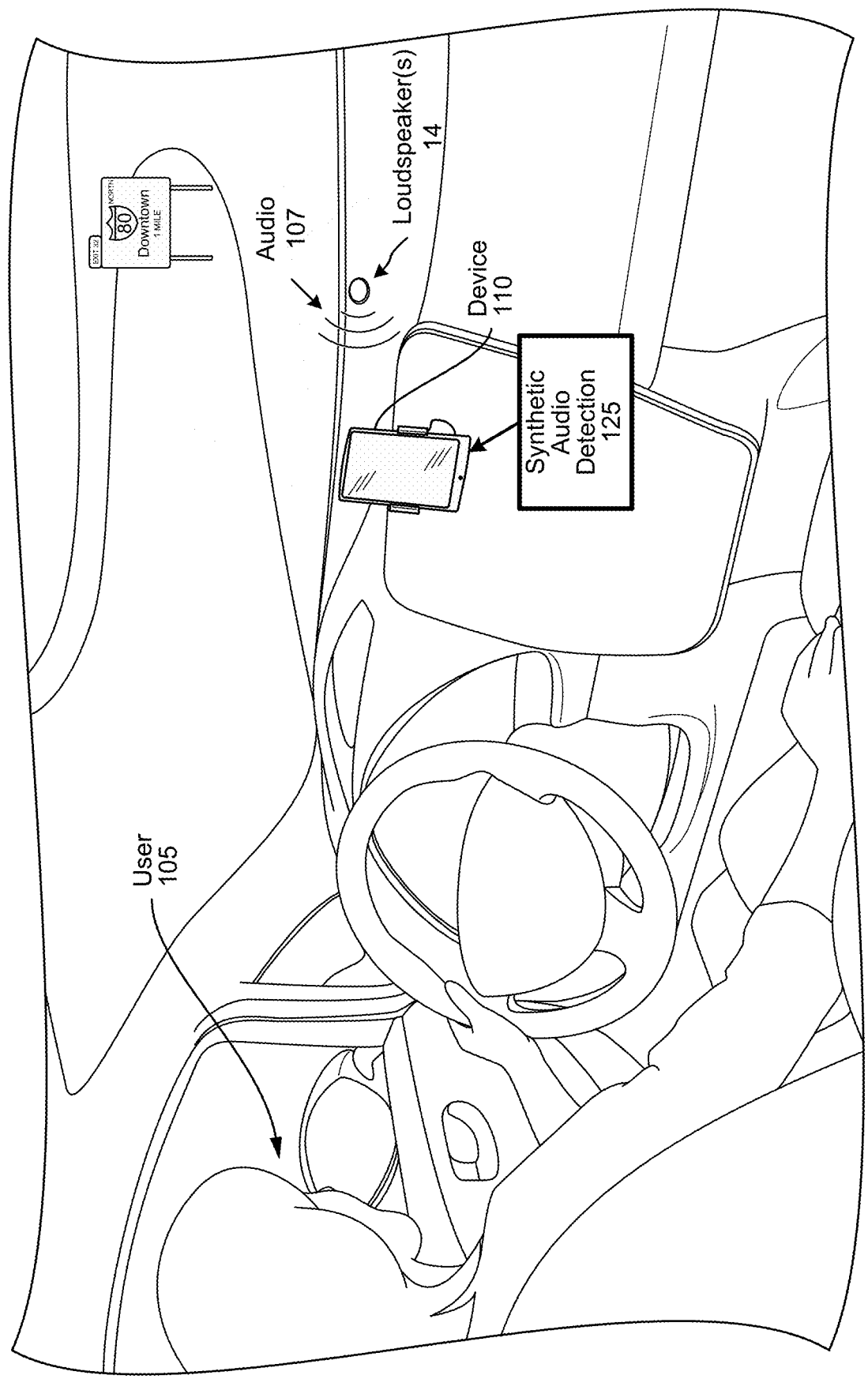

The example of FIG. 5D illustrates the device 110 located in a vehicle, which also includes a loudspeaker(s) 14 and the user 105. Thus, the environment of the device 110 may include the loudspeaker(s) 14 and the user 105. Audio received by the device 110 may be machine-outputted audio from the loudspeaker(s) 14 or non-machine outputted audio from the user 105. In the illustrated example, the loudspeaker(s) 14 may output audio 107, and the device 110 may receive the audio 107. Using the synthetic audio detection component 125 (as described herein), the device 110 may determine that the audio 107 is machine-outputted, and may ignore the audio 107 (as described in relation to FIGS. 2 and 3). That is, the device 110 may not perform any further processing with respect to the audio 107, and may thus not perform any action in response to the audio being outputted by the loudspeaker(s). In some cases, the device 110 may store the audio 107 for some time period, and may use the stored audio 107 to respond to any spoken inputs, if any, received from the user 105 (as described in relation to FIG. 4).

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

The system 100 may operate using various components as illustrated in FIG. 6. The various components may be located on a same or different physical devices. Communication between various components may occur directly or across a network(s) 199.

A microphone or array of microphones (of or otherwise associated with the device 110) may capture audio. The device 110 processes audio data, representing the audio 107, to determine whether speech is detected. The device 110 may use various techniques to determine whether audio data includes speech. In some examples, the device 110 may apply voice activity detection (VAD) techniques using the VAD component 130 described above in relation to FIG. 1.

Once speech is detected in audio data, the device 110 may determine if the speech is directed at the device 110/system 120. In at least some embodiments, such determination may be made using the wakeword detection component 520. The wakeword detection component 520 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMNIs for each wakeword and non-wakeword speech signals, respectively. The non-wakeword speech includes other spoken words, background noise, etc. There can be one or more HMIs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 520 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used. In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example, the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 520 detects a wakeword, the device 110 may "wake" and begin transmitting audio data 511, representing the audio 107, to the system 120 or to other components included in the device 110. The audio data 511 may include the detected wakeword, or the device 110 may remove the portion of the audio data, corresponding to the detected wakeword, prior to sending the audio data 511 to the system 120/other components of the device 110.

In some embodiments, the system 120 may include the synthetic audio detection component 125, which may function as described above in relation to FIG. 1. If the synthetic audio detection component 125 determines that the audio data 511 corresponds to machine-outputted audio, then the system 120 may not send the audio data 511 to other components for processing.

The system 120 may include an orchestrator component 530 configured to, among other things, coordinate data transmissions between components of the system 120. The orchestrator component 530 may receive the audio data 511 from the device 110, and send the audio data 511 to an ASR component 550.

The ASR component 550 transcribes the audio data 511 into ASR data including one or more ASR hypotheses. An ASR hypothesis may be configured as a textual interpretation of the speech (machine-outputted or non-machine-outputted) in the audio data 511, or may be configured in another manner, such as one or more tokens. Each ASR hypothesis may represent a different likely interpretation of the speech in the audio data 511. Each ASR hypothesis may be associated with a score (e.g., confidence score, probability score, or the like) representing the associated ASR hypothesis correctly represents the speech in the audio data 511.

The ASR component 550 interprets the speech in the audio data based on a similarity between the audio data and pre-established language models. For example, the ASR component 550 may compare the audio data 511 with models for sounds (e.g., subword units, such as phonemes, etc.) and sequences of sounds to identify words that match the sequence of sounds of the speech represented in the audio data. In some embodiments, the ASR component 550 may use acoustic models and language models to determine one or more words represented in the speech in the audio data.

In some embodiments, the ASR component 550 may use a neural network, such as, a recurrent neural network (RNN) (or other type of neural networks) to determine the ASR data corresponding to the speech captured in the audio data. In some embodiments, the ASR component 550 may use a RNN-transducer model, which may feed the prediction from a previous time step (e.g., a predicted token corresponding to a previous audio frame) an input layer to process the next time step (e.g., to predict the next token corresponding to the subsequent/next audio frame).

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 530. The orchestrator component 530 may send the text data or ASR data, depending on the type of natural language input received, to a NLU component 560.

The NLU component 560 processes the ASR data or text data to determine one or more NLU hypotheses embodied in NLU output data. The NLU component 560 may perform intent classification (IC) processing on the ASR output data or text data to determine an intent of the natural language input. An intent corresponds to an action to be performed that is responsive to the natural language input. To perform IC processing, the NLU component 560 may communicate with a database of words linked to intents. For example, a music intent database may link words and phrases such as "quiet," "volume off," and "mute" to a <Mute> intent. The NLU component 560 identifies intents by comparing words and phrases in ASR output data or text data to the words and phrases in an intents database. In some embodiments, the NLU component 560 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 560 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 560 may be linked to one or more grammar frameworks with entity types to be populated with entity values. Each entity type of a grammar framework corresponds to a portion of ASR output data or text data that the NLU component 560 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 560 may perform NER processing to identify words in ASR output data or text data as subject, object, verb, preposition, etc. based on grammar rules and/or models. Then, the NLU component 560 may perform IC processing using the identified verb to identify an intent. Thereafter, the NLU component 560 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 560 may generate NLU output data including one or more NLU hypotheses, with each NLU hypothesis including an intent and optionally one or more entity types and corresponding entity values. In some embodiments, the NLU component 560 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 550 and the NLU component 560). In at least some embodiments, the system 120 may implement a spoken language understanding (SLU) component configured to process audio data 511 to determine NLU output data.

The SLU component may be equivalent to a combination of the ASR component 550 and the NLU component 560. Yet, the SLU component may process audio data 511 and directly determine the NLU output data, without an intermediate step of generating ASR output data. As such, the SLU component may take audio data 511 representing a spoken natural language input and attempt to make a semantic interpretation of the spoken natural language input. That is, the SLU component may determine a meaning associated with the spoken natural language input and then implement that meaning. For example, the SLU component may interpret audio data 511 representing a spoken natural language input in order to derive a desired action. The SLU component may output a most likely NLU hypothesis, or multiple NLU hypotheses associated with respective confidence or other scores (such as probability scores, etc.).

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

The system 120 may include one or more skill components 590 and/or may communicate with one or more skill systems 525. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 590 may operate in conjunction between the system 120 and other devices, such as the device 110, a restaurant electronic ordering system, a taxi electronic booking system, etc. in order to complete certain functions. Inputs to a skill 590 may come from speech processing interactions or through other interactions or input sources.

A skill 590 may be associated with a domain, a non-limiting list of which includes a smart home domain, a music domain, a video domain, a weather domain, a communications domain, a flash briefing domain, a shopping domain, and a custom domain.

The system 120 may include a TTS component 580 that generates audio data including synthesized speech. The data input to the TTS component 580 may come from a skill system 525, the orchestrator component 530, or another component of the system 120.

In one method of synthesis called unit selection, the TTS component 580 matches input data against a database of recorded speech. The TTS component 580 selects matching units of recorded speech and concatenates the units together to form audio data. In another method of synthesis called parametric synthesis, the TTS component 580 varies parameters such as frequency, volume, and noise to determine audio data including an artificial speech waveform. Parametric synthesis uses a computerized voice generator, sometimes called a vocoder.

The system 120 may include a user recognition component 595. The user recognition component 595 may recognize one or more users using various data. The user recognition component 595 may take as input the audio data 511. In some embodiments, the user recognition component 595 may take as input the audio data 108 determined by the feature extraction component 140. In other embodiments, the user recognition component 595 may use the audio embedding data generated by the LSTM model 150 to recognize the user(s). The user recognition component 595 may perform user recognition by comparing speech characteristics, in the audio data 511, to stored speech characteristics of users. The user recognition component 595 may additionally or alternatively perform user recognition by comparing biometric data (e.g., fingerprint data, iris data, retina data, etc.), received by the system 120 in correlation with a natural language input, to stored biometric data of users. The user recognition component 595 may additionally or alternatively perform user recognition by comparing image data (e.g., including a representation of at least a feature of a user), received by the system 120 in correlation with a natural language input, with stored image data including representations of features of different users. The user recognition component 595 may perform other or additional user recognition processes, including those known in the art. For a particular natural language input, the user recognition component 595 may perform processing with respect to stored data of users associated with the device 110 that received the natural language input.

The user recognition component 595 determines whether a natural language input originated from a particular user. For example, the user recognition component 595 may determine a first value representing a likelihood that a natural language input originated from a first user, a second value representing a likelihood that the natural language input originated from a second user, etc. The user recognition component 595 may also determine an overall confidence regarding the accuracy of user recognition processing.

The user recognition component 595 may output a single user identifier corresponding to the most likely user that originated the natural language input. Alternatively, the user recognition component 595 may output multiple user identifiers (e.g., in the form of an N-best list) with respective values representing likelihoods of respective users originating the natural language input. The output of the user recognition component 595 may be used to inform NLU processing, processing performed by a skill system 525, as well as processing performed by other components of the system 120 and/or other systems.

The system 120 may include profile storage 570. The profile storage 570 may include a variety of data related to individual users, groups of users, devices, etc. that interact with the system 120. As used herein, a "profile" refers to a set of data associated with a user, group of users, device, etc.

The data of a profile may include preferences specific to the user, group of users, device, etc.; input and output capabilities of one or more devices; internet connectivity data; user bibliographic data; subscription data; skill enablement data; and/or other data.

The profile storage 570 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skill systems 525 that the user has enabled. When a user enables a skill system 525, the user is providing the system 120 with permission to allow the skill system 525 to execute with respect to the user's natural language inputs. If a user does not enable a skill system 525, the system 120 may not execute the skill system 525 with respect to the user's natural language inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 570 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The foregoing describes illustrative components and processing of the system 120. The following describes illustrative components and processing of the device 110. As illustrated in FIG. 7, in at least some embodiments the system 120 may receive the audio data 511 from the device 110, to recognize speech corresponding to a spoken natural language in the received audio data 511, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted with respect to FIG. 6, the device 110 may include a wakeword detection component 520 configured to be used to detect a wakeword (e.g., "Alexa") that indicates to the device 110 that the audio data 511 is to be processed for determining NLU output data. In at least some embodiments, a hybrid selector 624, of the device 110, may send the audio data 511 to the wakeword detection component 520. If the wakeword detection component 520 detects a wakeword in the audio data 511, the wakeword detection component 520 may send an indication of such detection to the hybrid selector 624. In response to receiving the indication, the hybrid selector 624 may send the audio data 511 to the system 120 and/or the ASR component 650. The wakeword detection component 520 may also send an indication, to the hybrid selector 624, representing a wakeword was not detected. In response to receiving such an indication, the hybrid selector 624 may refrain from sending the audio data 511 to the system 120, and may prevent the ASR component 650 from processing the audio data 511. In this situation, the audio data 511 can be discarded.

The device 110 may conduct its own speech processing using on-device language processing components (such as an on-device SLU component, the ASR component 650, and/or the NLU component 660) similar to the manner discussed above with respect to the ASR component 550 and the NLU component 560. The device 110 may also internally include, or otherwise have access to, other components such as a TTS component 680 (configured to process in a similar manner to the TTS component 580), one or more skill components 690, a user recognition component 695 (configured to process in a similar manner to the user recognition component 595), profile storage 670 (configured to store similar profile data to the profile storage 570), and other components. In at least some embodiments, the profile storage 670 may only store profile data for a user or group of users specifically associated with the device 110. Some of the components included in the device 110 may be customized or specifically configured for the user 105 or a group of users associated with the device 110. In some embodiments, the ASR component 650 may implement a different technique than the ASR component 550. For example, the ASR component 650 may use a RNN model, while the ASR component 550 may use acoustic models and language models.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 624, of the device 110, may include a hybrid proxy (HP) 626 configured to proxy traffic to/from the system 120. For example, the HP 626 may be configured to send messages to/from a hybrid execution controller (HEC) 627 of the hybrid selector 624. For example, command/directive data received from the system 120 can be sent to the HEC 627 using the HP 626. The HP 626 may also be configured to allow the audio data 511 to pass to the system 120 while also receiving (e.g., intercepting) this audio data 511 and sending the audio data 511 to the HEC 627.

In at least some embodiments, the hybrid selector 624 may further include a local request orchestrator (LRO) 628 configured to notify the device ASR component 650 about the availability of the audio data 511, and to otherwise initiate the operations of on-device language processing when the audio data 511 becomes available. In general, the hybrid selector 624 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 511 is received, the HP 626 may allow the audio data 511 to pass through to the system 120 and the HP 626 may also input the audio data 511 to the ASR component 650 by routing the audio data 511 through the HEC 627 of the hybrid selector 624, whereby the LRO 628 notifies the ASR component 650 of the audio data 511. At this point, the hybrid selector 624 may wait for response data from either or both the system 120 and/or the on-device language processing components. However, the disclosure is not limited thereto, and in some examples the hybrid selector 624 may send the audio data 511 only to the ASR component 650 without departing from the disclosure. For example, the device 110 may process the audio data 511 on-device without sending the audio data 511 to the system 120.

The ASR component 650 is configured to receive the audio data 511 from the hybrid selector 624, and to recognize speech in the audio data 511, and the NLU component 660 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the NLU component 660) may be selected as usable to respond to a natural language input, and local response data may be sent (e.g., local NLU output data, local knowledge base information, internet search results, and/or local directive data) to the hybrid selector 624, such as a "ReadyToExecute" response. The hybrid selector 624 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 5.

The device 110 and/or the system 120 may associate a unique identifier with each natural language input. The device 110 may include the unique identifier when sending the audio data 511 to the system 120, and the response data from the system 120 may include the unique identifier to identify to which natural language input the response data corresponds.

In at least some embodiments, the device 110 may include one or more skill systems 525 that may process similarly to the speech processing system-implemented skill(s) 525. The skill(s) 525 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
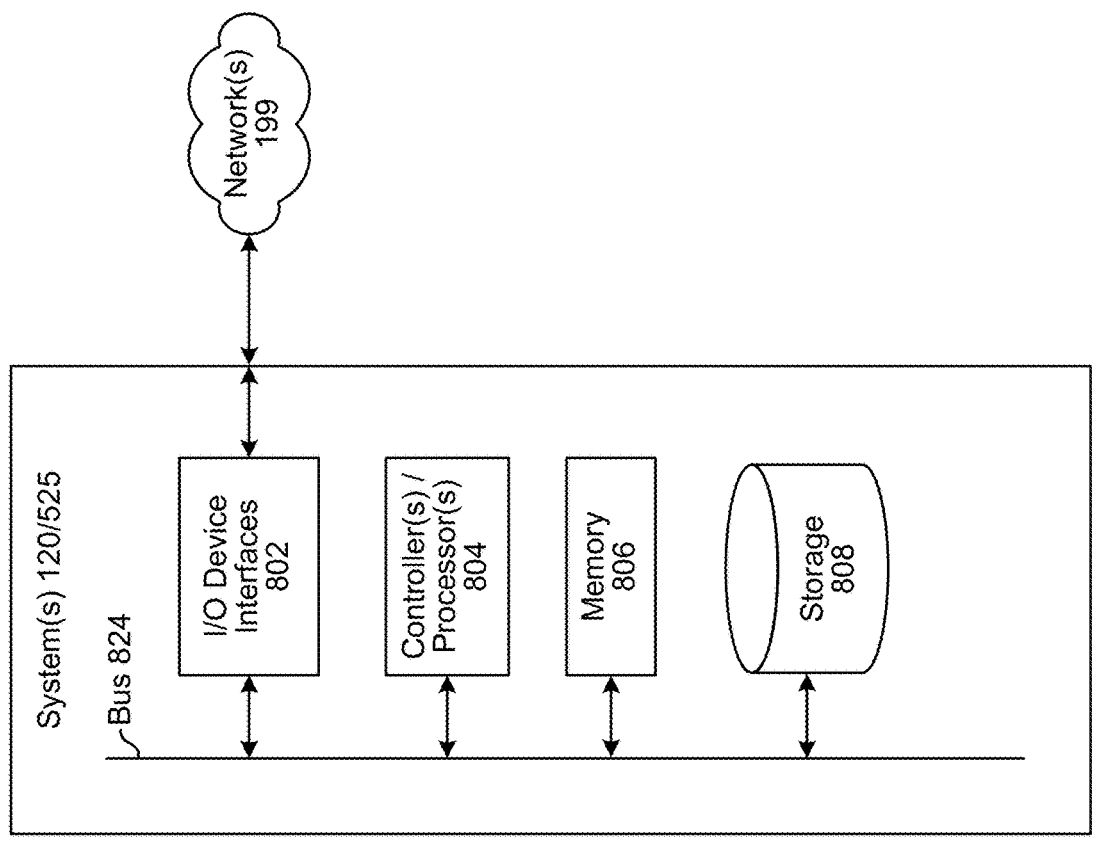
FIG. 9 is a block diagram conceptually illustrating example components of a system, according to embodiments of the present disclosure.

FIG. 8 is a block diagram conceptually illustrating a device 110 of the system 100. FIG. 9 is a block diagram conceptually illustrating example components of a system, such as the system 120, and the skill(s) system 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/525) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/525) may be included in the system 100 of the present disclosure, such as, one or more systems 120 and/or one or more skill systems 525. In operation, each of these systems may include computer-readable and computer-executable instructions that reside on the respective device (120/525), as will be discussed further below.

Each of these devices (110/120/525) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/525) may also include a data storage component (708/808) for storing data and controller/processor-executable instructions. Each data storage component (708/808) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (702/802).

Computer instructions for operating each device (110/120/525) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/525) includes input/output device interfaces (702/802). A variety of components may be connected through the input/output device interfaces (702/802), as will be discussed further below. Additionally, each device (110/120/525) may include an address/data bus (724/824) for conveying data among components of the respective device. Each component within a device (110/120/525) may also be directly connected to other components in addition to (or instead of) being connected to other components across the bus (724/824).

Referring to FIG. 8, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, and/or skill system 525 may include their own dedicated processors, memory, and/or storage. Alternatively, one or more of the components of the device 110, the system 120, and/or skill system 525 may utilize the I/O interfaces (702/802), processor(s) (704/804), memory (706/806), and/or storage (708/808) of the device 110, the system 120, and/or skill system 525, respectively.

As noted above, multiple devices may be employed in a single system. In such a multi-device system, each of the devices may include different components for performing different aspects of the system's processing. The multiple devices may include overlapping components. The components of the device 110, the system 120, and the skill system 525, as described herein, are illustrative, and may be located as a stand-alone device or may be included, in whole or in part, as a component of a larger device or system.

Figure 10:
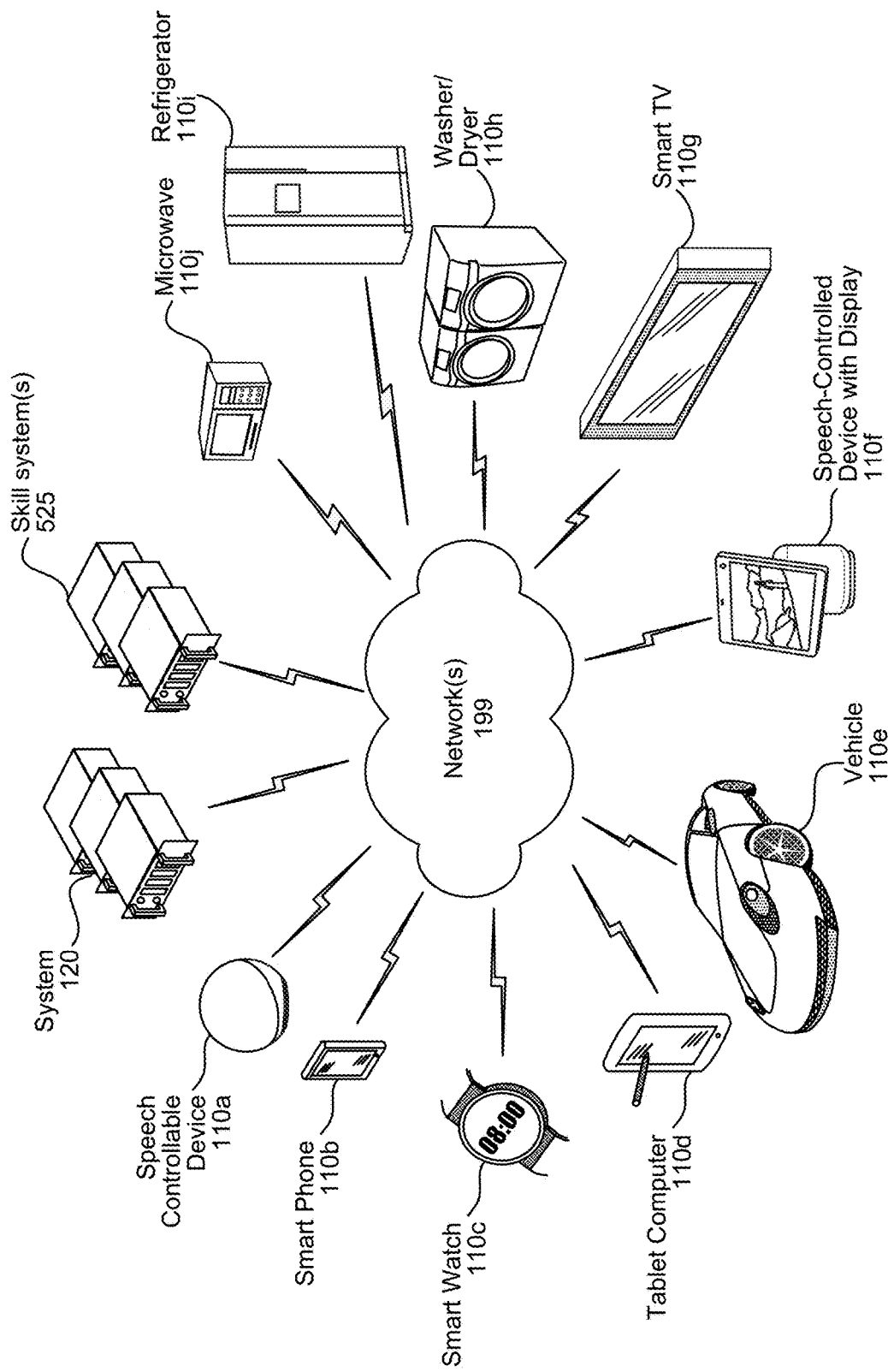
FIG. 10 illustrates an example of a computer network for use with the overall system, according to embodiments of the present disclosure.

As illustrated in FIG. 10, multiple devices (110a-110j, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill system 525, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first audio data;
   determining first audio embedding data using a first machine learning (ML) model and a portion of the first audio data;
   determining, using the first audio embedding data, that the first audio data corresponds to machine-outputted audio;
   in response to determining that the first audio data corresponds to machine-outputted audio, storing the first audio data;
   receiving second audio data;
   determining, using the first ML model and the second audio data, second audio embedding data;
   determining, using the second audio embedding data, that the second audio data corresponds to non-machine-outputted audio;
   in response to determining that the second audio data corresponds to non-machine-outputted audio, determining the second audio data includes a user input relating to content of the first audio data; and
   based at least in part on the first audio data, determining first output data responsive to the user input.

2. The computer-implemented method of claim 1, further comprising:
   determining that the second audio data corresponds to non-machine-outputted audio; and
   in response to determining that the second audio data corresponds to non-machine-outputted audio, sending the second audio data to an automatic speech recognition (ASR) component for processing.

3. The computer-implemented method of claim 1, further comprising:
   processing, using an automatic speech recognition (ASR) component, the first audio data; and
   in response to determining that the first audio data corresponds to machine-outputted audio, ceasing processing by the ASR component.

4. The computer-implemented method of claim 1, further comprising:
   receiving first audio;
   determining that the first audio includes speech; and
   in response to determining that the first audio includes speech, processing the first audio to determine the first audio data, wherein the first audio data includes log Mel-filterbank energies feature data.

5. The computer-implemented method of claim 1, wherein the first audio data is received at a device, and the method further comprises:
in response to determining that the first audio data corresponds to machine-outputted audio, sending, to the device, second output data indicating the first audio data was outputted by a machine.

6. The computer-implemented method of claim 1, further comprising:
determining first automatic speech recognition (ASR) data corresponding to the first audio data;
determining second ASR data corresponding to the second audio data; and
determining, using the second ASR data, natural language understanding (NLU) data corresponding to the user input,
wherein determining that the second audio data includes the user input relating to content of the first audio data is based on processing the first ASR data and the NLU data.

7. The computer-implemented method of claim 1, wherein determining that the first audio data corresponds to machine-outputted audio further comprises determining that the first audio data corresponds to a synthesized speech category.

8. The computer-implemented method of claim 1, further comprising:
in response to determining that the first audio data corresponds to machine outputted audio, generating second output data indicating the first audio data was outputted by a machine; and
sending the second output data to a system component.

9. The computer-implemented method of claim 1,
wherein determining that the first audio data corresponds to machine-outputted audio further comprises determining that the first audio data corresponds to a recorded audio category, and
wherein determining that the second audio data includes the user input relating to the content of the first audio data is based on determining that the first audio data corresponds to the recorded audio category.

10. A system comprising:
at least one processor; and
at least one memory including instructions that, when executed by the at least one processor, cause the system to:
receive first audio data;
determine first audio embedding data using a first machine learning (ML) model and a portion of the first audio data;
determine, using the first audio embedding data, that the first audio data corresponds to machine-outputted audio;
in response to determining that the first audio data corresponds to machine-outputted audio, storing the first audio data;
receive second audio data;
determine, using the first ML model and the second audio data, second audio embedding data;
determining, using the second audio embedding data, that the second audio data corresponds to non-machine-outputted audio;
in response to determining that the second audio data corresponds to non-machine-outputted audio, determine the second audio data includes a user input relating to content of the first audio data; and
based at least in part on the first audio data, determining second output data responsive to the user input.

11. The system of claim 10, wherein the at least one memory includes further instructions that, when executed by the at least one processor, further cause the system to:
determine that the second audio data corresponds to non-machine-outputted audio; and
in response to determining that the second audio data corresponds to non-machine-outputted audio, send the second audio data to an automatic speech recognition (ASR) component for processing.

12. The system of claim 10, wherein the at least one memory includes further instructions that, when executed by the at least one processor, further cause the system to:
process, using an automatic speech recognition (ASR) component, the first audio data; and
in response to determining that the first audio data corresponds to machine-outputted audio, cease processing by the ASR component.

13. The system of claim 10, wherein the at least one memory includes further instructions that, when executed by the at least one processor, further cause the system to:
receive first audio;
determine that the first audio includes speech; and
in response to determining that the first audio includes speech, process the first audio to determine the first audio data, wherein the first audio data includes log Mel-filterbank energies feature data.

14. The system of claim 10, wherein the first audio data is received at a device, and wherein the at least one memory includes further instructions that, when executed by the at least one processor, further cause the system to:
in response to determining that the first audio data corresponds to machine-outputted audio, send, to the device, second output data indicating the first audio data was outputted by a machine.

15. The system of claim 10, wherein the at least one memory includes further instructions that, when executed by the at least one processor, further cause the system to:
determine first automatic speech recognition (ASR) data corresponding to the first audio data;
determine second ASR data corresponding to the second audio data; and
determine, using the second ASR data, natural language understanding (NLU) data corresponding to the user input;
wherein determining that the second audio data includes the user input relating to content of the first audio data is based on processing the first ASR data and the NLU data.

16. The system of claim 10,
wherein the instruction that causes the system to determine that the first audio data corresponds to machine-outputted audio further causes the system to determine that the first audio data corresponds to a synthesized speech category.

17. The system of claim 10, wherein the at least one memory includes further instructions that, when executed by the at least one processor, further cause the system to:
in response to determining that the first audio data corresponds to machine outputted audio, generate second output data indicating the first audio data was outputted by a machine; and
send the second output data to a system component.

18. The system of claim 10,
Wherein the instruction that causes the system to determine that the first audio data corresponds to machine-outputted audio further causes the system to determine that the first audio data corresponds to a recorded audio category, and
wherein determining that the second audio data includes the user input relating to the content of the first audio data is based on determining that the first audio data corresponds to the recorded audio category.

19. A computer-implemented method comprising:
receiving first audio;
determining, using a Long Short-Term Memory (LSTM) model and a portion of the first audio, first audio embedding data corresponding to the first audio;
processing the first audio embedding data using a logistic regression model to determine that the first audio corresponds to machine-outputted audio;
in response to determining that the first audio data corresponds to machine outputted audio, storing the first audio data;
after receiving the first audio, receiving, by the device, second audio;
determining, using the LSTM model and a portion of the second audio, second audio embedding data corresponding to the second audio;
determining, using the second audio embedding data, that the second audio corresponds to non-machine-outputted audio;
in response to determining that the second audio corresponds to non-machine-outputted audio, processing the second audio embedding data using an automatic speech recognition (ASR) component to determine first ASR data corresponding to a spoken user input represented in the second audio;
determining, using the first ASR data and content represented in the first audio, that the spoken user input relates to the first audio;
determining, using the first ASR data and the first audio, first output data responsive to the spoken user input; and
causing presentation of the first output data.

20. The computer-implemented method of claim 19, further comprising:
wherein determining the second audio corresponds to non-machine-outputted audio is based on processing the second audio embedding data using the logistic regression model.

21. The computer-implemented method of claim 19, further comprising:
processing the first audio to determine that the first audio includes speech;
in response to determining that the first audio includes speech, processing the first audio to determine that the first audio includes a representation of a wakeword; and
in response to the first audio including the representation of the wakeword, determining first feature data corresponding to the first audio.

* * * * *